US011857933B2

(12) United States Patent
Jagers et al.

(10) Patent No.: US 11,857,933 B2
(45) Date of Patent: Jan. 2, 2024

(54) SYSTEMS, APPARATUSES, AND METHODS FOR MIXING FLUIDS USING A CONICAL FLOW MEMBER

(71) Applicant: Produced Water Absorbents Inc., Houston, TX (US)

(72) Inventors: William Jagers, Houston, TX (US); Terry Lou, Houston, TX (US); Eilidh Keachie, Houston, TX (US); John Sabey, Houston, TX (US); Greg Hallahan, Houston, TX (US)

(73) Assignee: PRODUCED WATER ABSORBENTS INC., Houston, TX (US)

( * ) Notice: Subject to any disclaimer, the term of this patent is extended or adjusted under 35 U.S.C. 154(b) by 404 days.

(21) Appl. No.: 16/296,990

(22) Filed: Mar. 8, 2019

(65) Prior Publication Data

US 2019/0275479 A1 Sep. 12, 2019

Related U.S. Application Data

(60) Provisional application No. 62/640,977, filed on Mar. 9, 2018, provisional application No. 62/698,428, filed on Jul. 16, 2018.

(51) Int. Cl.

*B01F 25/313* (2022.01)
*B01F 25/433* (2022.01)
*B01F 101/00* (2022.01)

(52) U.S. Cl.

CPC ...... *B01F 25/3133* (2022.01); *B01F 25/3131* (2022.01); *B01F 25/31322* (2022.01); *B01F 25/4335* (2022.01); *B01F 2101/2204* (2022.01)

(58) Field of Classification Search

CPC .... B01F 5/0461; B01F 5/0451; B01F 5/0456; B01F 5/0652; B01F 2215/0036;

(Continued)

(56) References Cited

U.S. PATENT DOCUMENTS 1,126,275 A * 1/1915 Rice .......................... G01F 1/44
73/861.64
1,454,196 A * 5/1923 Trood .................. B01F 5/0415
48/189.4

(Continued)

*Primary Examiner* — Charles Cooley

(74) *Attorney, Agent, or Firm* — Norton Rose Fulbright US LLP

(57) ABSTRACT

A mixing apparatus for in-line mixing of fluids is described herein. In some embodiments, the mixing apparatus comprises a mixer body defining a plurality of support arms and a substantially conical flow member that can be coupled to the plurality of support arms. In other embodiments, the mixer body defines at least one body injection passage extending from an injection inlet on the exterior surface of the mixer body through one of the support arms; the flow member defines a flow member injection passage extending through at least a portion of the flow member to an injection outlet defined at the leading end or the peripheral surface of the flow member; and the flow member is coupled to the support arms such that the injection inlet is in fluid communication with the injection outlet via the mixer body injection passage and the flow member injection passage.

18 Claims, 20 Drawing Sheets

(58) Field of Classification Search
CPC ................ B01F 5/0458; B01F 25/3133; B01F 25/3131; B01F 25/31322; B01F 25/4335; B01F 2101/2204; B01F 25/31323
USPC ................................ 366/167.1, 174.1, 175.2
See application file for complete search history.

(56) References Cited

U.S. PATENT DOCUMENTS 1,496,345 A * 6/1924 Lichtenthaeler ...... B01F 5/0451 366/165.2
1,810,131 A * 6/1931 Daily .................... B01F 5/0415 261/76
1,942,293 A * 1/1934 Kane .................... F02M 25/028 48/180.1
2,021,092 A * 11/1935 Teliet ...................... B28C 5/026 366/131
2,595,720 A * 5/1952 Snyder ................... F02M 17/02 261/50.2
2,907,557 A * 10/1959 Coanda ............... B01F 3/04049 261/78.1
2,935,840 A * 5/1960 Schoppe .................. B01J 19/00 60/208
3,049,009 A * 8/1962 McCall ................. G01F 1/1155 73/861.92
3,143,401 A * 8/1964 Lambrecht ................ F23R 3/28 48/180.1
3,196,680 A * 7/1965 Curran ...................... G01F 1/44 73/861.52
3,376,023 A * 4/1968 Lage ..................... B01F 5/0609 366/167.1
3,467,072 A * 9/1969 Toesca ................... F02M 29/04 123/590
3,572,117 A * 3/1971 Rodely ................. G01F 1/3218 73/861.22
3,675,901 A * 7/1972 Rion ..................... B01F 5/0451 366/174.1
3,794,299 A * 2/1974 Wagner ................. B01F 5/0057 210/198.1
4,051,204 A * 9/1977 Muller ................... C12M 27/24 261/36.1
4,270,576 A * 6/1981 Takeda .................. B01F 5/0451 137/888
4,275,841 A * 6/1981 Takeyama ............... F23D 11/38 239/431
4,299,655 A * 11/1981 Skaugen ............... B01F 5/0413 162/343
4,408,890 A * 10/1983 Beckmann .......... B01F 25/3131 366/173.1
4,491,551 A * 1/1985 Johnson ................. B01D 35/06 261/122.1
4,519,423 A * 5/1985 Ho .......................... B01F 5/045 137/888
4,564,298 A * 1/1986 Gritters ................... B01F 5/045 137/896
4,586,825 A * 5/1986 Hayatdavoudi ....... B01F 5/0212 134/179
4,673,006 A * 6/1987 Speck ................... B08B 9/0933 137/892
4,753,535 A * 6/1988 King ................. B01F 25/43151 366/337
4,790,666 A * 12/1988 Koziol .................. B01F 5/0057 210/512.1
4,812,049 A * 3/1989 McCall ............... B01F 25/3131 366/181.5
4,861,165 A * 8/1989 Fredriksson .......... B01F 5/0065 366/165.1
5,176,448 A * 1/1993 King ..................... B01F 25/313 366/339
5,356,213 A * 10/1994 Arpentinier ............. F23L 7/007 366/165.1
5,363,699 A * 11/1994 McCall ..................... F15D 1/02 73/198
5,388,906 A * 2/1995 Rao ....................... B01F 25/313 366/173.2
5,466,063 A * 11/1995 Poyet .................... B01F 5/0453 366/6
5,554,805 A * 9/1996 Bahrton .................... G01F 1/42 73/202
5,705,060 A * 1/1998 Robberts ............... B01F 5/0057 210/198.1
5,806,976 A * 9/1998 Roque ................... B01F 3/0861 366/338
5,810,052 A * 9/1998 Kozyuk ................ B01F 3/0811 138/37
5,865,537 A * 2/1999 Streiff ..................... B29B 7/325 366/144
6,027,241 A * 2/2000 King ..................... B01F 23/453 366/181.5
6,200,014 B1 * 3/2001 Babenko ............... B01F 5/0451 366/167.1
6,276,823 B1 * 8/2001 King ................... B01F 25/4314 366/181.5
6,749,330 B2 * 6/2004 Allen .................. B01F 25/3132 366/178.2
7,025,338 B2 * 4/2006 Cincotta ............. B01F 15/0429 261/64.1
7,547,002 B2 * 6/2009 Mao .......................... C01B 3/38 261/78.1
8,033,714 B2 * 10/2011 Nishioka ................ F23J 15/003 366/337
8,387,438 B2 * 3/2013 Lawrence ........... G01F 25/0007 73/1.35
8,683,875 B2 * 4/2014 Lawrence ................. G01F 1/36 73/861.65
8,984,961 B2 * 3/2015 Irani ......................... G01F 1/44 73/861.52
9,031,763 B2 * 5/2015 Green ..................... F02D 43/04 701/103
9,046,115 B1 * 6/2015 England ................ B01F 5/0618
9,151,658 B2 * 10/2015 Lawrence ........... G01F 25/0007
9,259,704 B2 * 2/2016 Gillis ................... B01J 19/1812
9,295,953 B2 * 3/2016 Linga ...................... B01F 25/45
9,383,476 B2 * 7/2016 Trehan ............... G01N 33/2847
9,403,132 B2 * 8/2016 Hata ..................... B01F 3/0807
9,487,842 B2 * 11/2016 Das ........................ C21D 9/085
9,616,399 B2 * 4/2017 Matula .................. B05B 7/0408
9,739,651 B1 * 8/2017 Al-Otaibi .................. G01F 1/22
9,931,602 B1 * 4/2018 Mazzei ................. B01F 3/0446
10,092,886 B2 * 10/2018 Kashihara ............. F28D 21/001
10,399,046 B1 * 9/2019 Smith ............... B01F 25/31331
10,710,033 B2 * 7/2020 Linga ..................... C10G 33/04
11,534,728 B2 * 12/2022 Manda Venkata Naga ................. B01F 23/2132
2006/0245296 A1 * 11/2006 Nishioka ................. F23D 14/64 366/174.1
2008/0163627 A1 * 7/2008 ELKady ................... F23R 3/14 60/737
2013/0336084 A1 * 12/2013 Janz ...................... B01F 3/0865 366/338
2014/0053816 A1 * 2/2014 Czapka ................ F02M 21/042 123/527
2015/0000643 A1 * 1/2015 Green ................ F02M 21/0215 123/526
2015/0020770 A1 * 1/2015 Green ................. F02D 41/0025 123/344
2015/0025774 A1 * 1/2015 Green ................. F02D 41/0027 701/103
2019/0134653 A1 * 5/2019 Saunders .............. B05B 7/0416
2019/0275479 A1 * 9/2019 Jagers ................. B01F 25/3131
2020/0108358 A1 * 4/2020 Sabey .................... B01F 25/311
2020/0179883 A1 * 6/2020 Sabey ............... B01F 25/31241
2023/0065989 A1 * 3/2023 Geant ................. B01F 25/3133

* cited by examiner

FIG. 3C
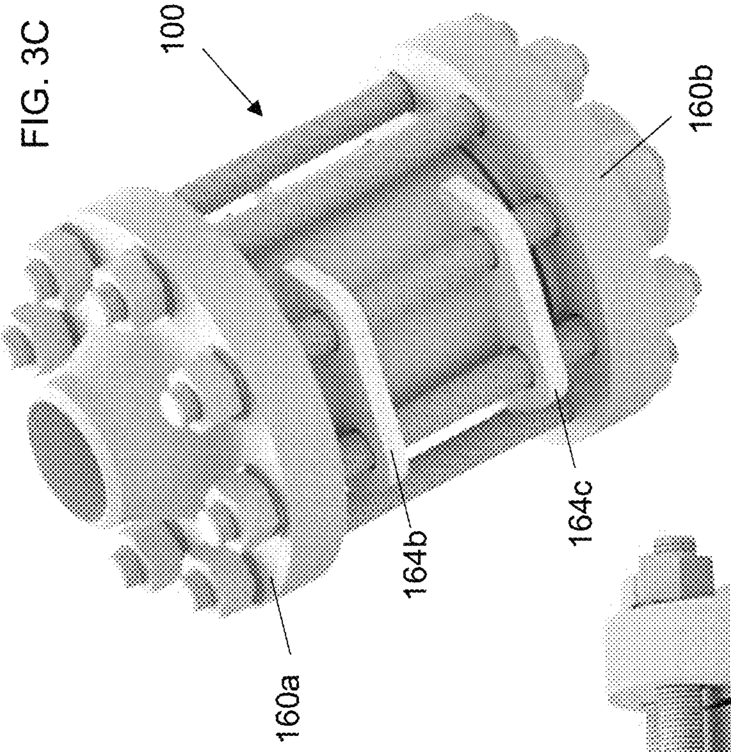
FIG. 3A
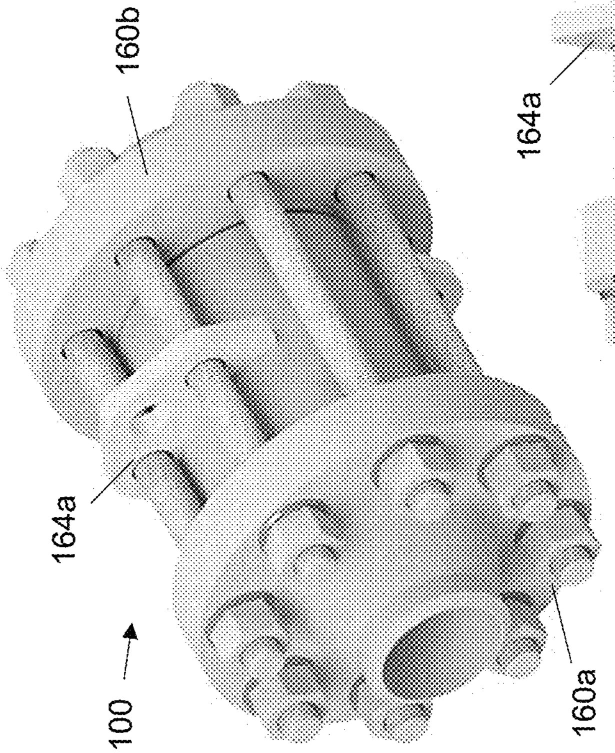
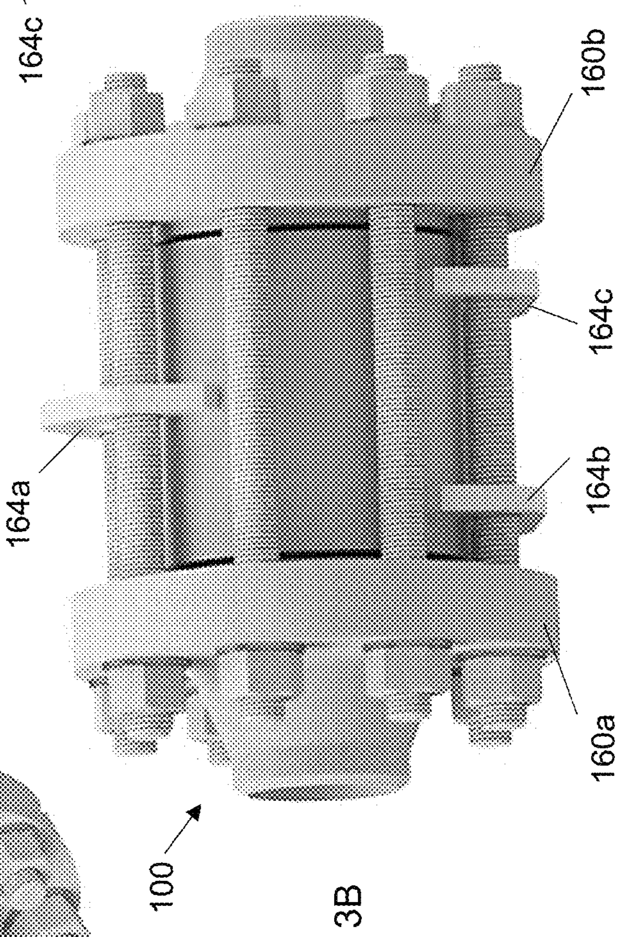
FIG. 3B

SYSTEMS, APPARATUSES, AND METHODS FOR MIXING FLUIDS USING A CONICAL FLOW MEMBER

CROSS-REFERENCE TO RELATED APPLICATIONS

The present application claims priority to U.S. Provisional Patent Application No. 62/640,977 filed Mar. 9, 2018, and U.S. Provisional Patent Application No. 62/698,428 filed Jul. 16, 2018, the disclosures of which applications are hereby incorporated by reference in their respective entireties.

TECHNICAL FIELD

The present application relates to injection into, mixing and conditioning of fluids flowing through a pipeline. More particularly, but not by way of limitation, the application relates to an integral weldless in-line injection mixer, a mixer and an assembly including the multi fluid injection mixer, feasible for a large number of mixing, injection and conditioning operations, particularly related to processing of hydrocarbons and in-line reactor processes for the production of fine chemicals.

BACKGROUND

U.S. Pat. No. 9,295,953 (the '953 patent) discloses certain examples of such mixers. Like other prior art mixers, the mixers disclosed in the '953 patent are complex and expensive to manufacture. However, the complex geometries of the mixers disclosed in the '953 patent make it exceedingly difficult to simplify their manufacture or otherwise reduce their cost.

SUMMARY

The present mixers are relatively simpler than conventional mixers typically utilized for applications in production and processing of chemicals, for example scavenging $H_2S$ from natural gas or adding wax inhibitors to petroleum pipeline flows. The present mixers may be configured for relatively smaller installations; for example, in piping with 2, 3, 4, 5, or 6 inch diameter.

Some embodiments of the present apparatuses comprise: a mixer body having an exterior surface and an interior surface, the mixer body defining an inlet and an outlet, the interior surface defining a passage extending between the inlet and the outlet to permit a first fluid to flow sequentially through the inlet, the passage, and the outlet, where: a first portion of the passage narrows in the direction of flow from the inlet to a point of constriction; a second portion of the passage expands in the direction of flow from the point of constriction to the outlet; a channel axis extends longitudinally through the center of the first and second portions of the passage; and the mixer body defines a plurality of support arms that are unitary with the mixer body and that extend radially inward from the interior surface in the first portion of the passage. Such embodiments can also comprise: a substantially conical flow member having a leading end, a base opposite the leading end, a peripheral surface extending between the leading end and the base, and a flow axis extending through respective centers of the leading end and the base; and where the flow member is coupled to the support arms such that the leading end faces the inlet of the mixer body, the base faces the outlet of the mixer body, and the flow axis is substantially parallel to the channel axis.

In some embodiments of the present mixing apparatuses: the mixer body defines at least one body injection passage extending from an injection inlet on the exterior surface of the mixer body through one of the support arms; the flow member defines a flow member injection passage extending through at least a portion of the flow member to an injection outlet defined at the leading end or the peripheral surface of the flow member; and the flow member is coupled to the support arms such that the injection inlet is in fluid communication with the injection outlet via the mixer body injection passage and the flow member injection passage.

In some embodiments of the present mixing apparatuses, the injection outlet is defined at the leading end of the flow member.

In some embodiments of the present mixing apparatuses: the flow member defines a plurality of injection passages each extending through at least a portion of the flow member to an injection outlet defined at the peripheral surface of the flow member; and the flow member is coupled to the support arms such that the injection inlet is in fluid communication with all of the injection outlets via the mixer body injection passage and the flow member injection passages.

In some embodiments of the present mixing apparatuses, the flow member is unitary with the support arms.

In some embodiments of the present mixing apparatuses, the mixer body does not include pipe flanges.

In some embodiments of the present mixing apparatuses, longitudinal ends of the mixer body are not threaded.

In some embodiments of the present mixing apparatuses, two or more flanges extend radially outward from the exterior surface of the mixer body, the two or more flanges are longitudinally spaced along the exterior surface of the mixer body, the two or more flanges defining a plurality of pairs of guide openings, each pair of guide openings being aligned along a respective guide axis that is parallel to the channel axis.

In some embodiments of the present mixing apparatuses, the mixer body defines two differential pressure ports extending from the exterior surface of the mixer body into the channel. In some such embodiments, a first one of the differential pressure port extends to the first portion of the passage and a second one of the differential pressure ports extends into the second portion of the passage.

In some embodiments of the present mixing apparatuses, the longitudinal ends of the mixer body define threads configured to receive a pipe fitting and hammer union washer or flange fitting.

In some embodiments of the present mixing apparatuses, the longitudinal ends of the mixer body define male threads.

In some embodiments of the present mixing apparatuses, the longitudinal ends of the mixer body define female threads.

In some embodiments of the present mixing apparatuses, the mixing apparatus further comprises flange fittings, each flange comprising a pressure port.

In some embodiments of the present mixing apparatuses, the longitudinal ends of the mixer body define hammer union joints.

In some embodiments of the present mixing apparatuses, the longitudinal ends of the mixer body define flange faces.

In some embodiments of the mixing apparatus, the mixer body has an exterior surface, and interior surface that narrows towards a point of constriction from the inlet end facing side to the outlet end facing side, and an extension piece coupled to the outlet facing side of the mixer body. The extension piece has an exterior surface, an interior surface that aligns with the interior surface of the mixer body such that when the extension piece is coupled to the mixer body, the interior surface of the extension piece expands outward from the point of constriction towards the outlet end facing side.

In some embodiments of the present mixing apparatuses, the flange faces define a plurality of threaded holes disposed radially around the flange faces.

In some embodiments of the present mixing apparatuses, the plurality of threaded holes comprise a plurality of threaded studs extending therefrom.

In some embodiments of the present mixing apparatuses, each of the support arms has a longitudinal axis disposed at an angle 85 to 95 degrees relative to the flow axis.

In some embodiments of the present mixing apparatuses, each of the support arms are configured such that each support arm has a corresponding injection inlet in fluid communication with the injection outlet via the mixer body injection passage and the flow member injection passage.

In some embodiments of the present mixing apparatuses, one or more of the support arm injection inlets may be plugged from a first injection passage end toward a second injection passage end to prevent passage of fluid to the flow member injection passage.

In some embodiments of the present mixing apparatuses, the mixer body is coupled to a pipe fitting configured to permit injection of more than one chemical by one or more of the following: an off-center drill tap, an upstream injection quill, a bleed ring, an injection weldolet, or other entry point.

In some embodiments of the present mixing apparatuses, the mixing apparatus is connected in series, each mixing apparatus configured to receive a chemical to be mixed with an upstream mixture of chemicals.

In some embodiments of the present mixing apparatuses, the mixer body defines an elongated, narrow pipe with an inner diameter less than the pipe inner diameter of the upstream and downstream longitudinal ends, where increased velocity and turbulence is provided by larger mass transfer contact prior to allowing the downstream cone opening to occur at an 8 degree angle.

In some embodiments of the present mixing apparatuses, the injection inlet is omitted from the exterior surface of the mixer body.

In some embodiments of the present mixing apparatuses, the flow member is configured as an interchangeable component within a flange connection.

In some embodiments of the present mixing apparatuses, the mixer body is machined as a full pipe outer diameter from a single piece of metal and coupled between two flanges.

In some embodiments of the present mixing apparatuses, the mixer body is configured to be interchangeable based on process flow conditions.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale for at least the embodiments shown.

FIG. 3A shows a perspective view of the mixing apparatus of FIG. 1A assembled between two flanges.

FIG. 3B shows a side view of the mixing apparatus of FIG. 1A assembled between two flanges.

FIG. 3C shows a bottom view of the mixing apparatus of FIG. 1A assembled between two flanges.

DETAILED DESCRIPTION OF ILLUSTRATIVE EMBODIMENTS

Figure 1A:
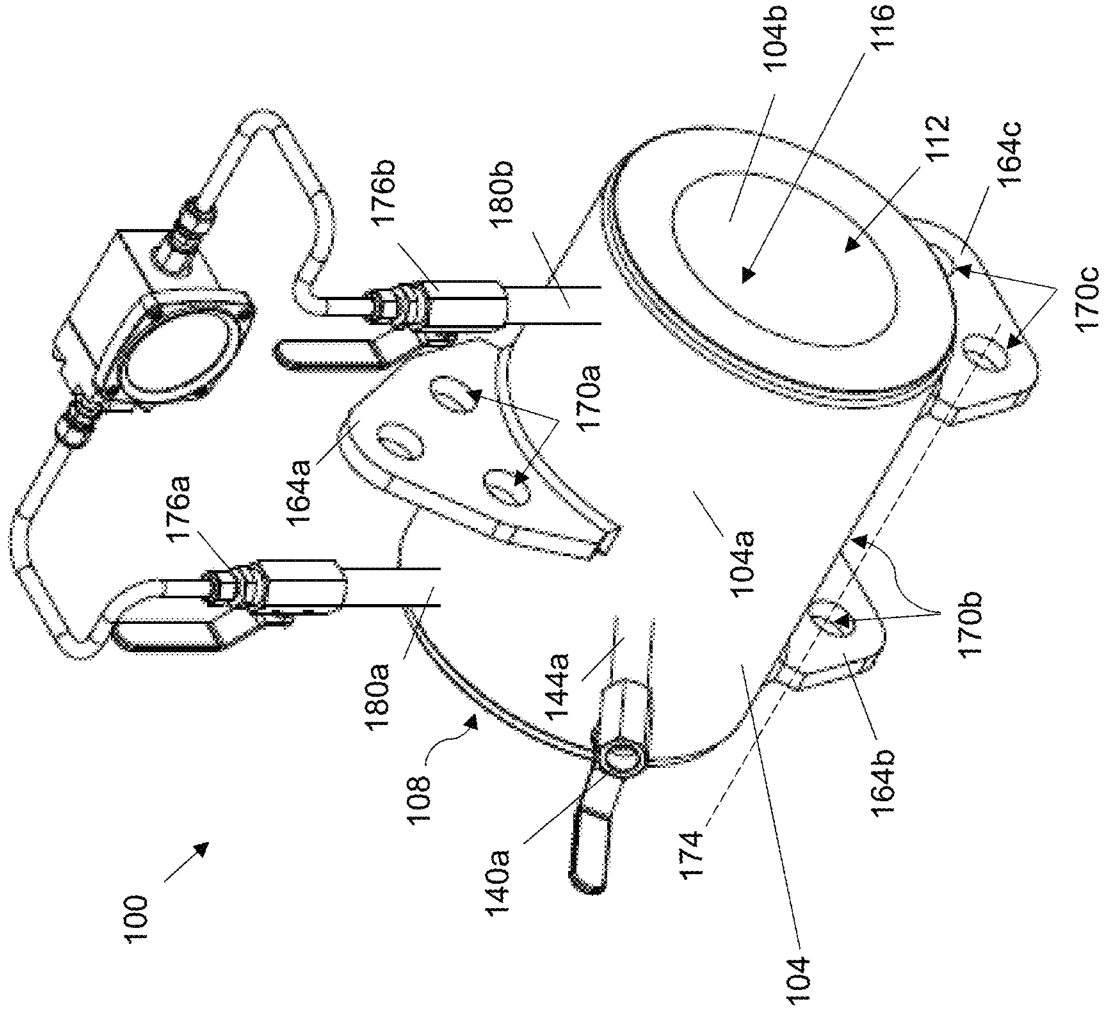
FIG. 1A shows an isometric view of an embodiment of the present mixing apparatuses with integrally formed differential pressure ports and an injection inlet.
Figure 1C:
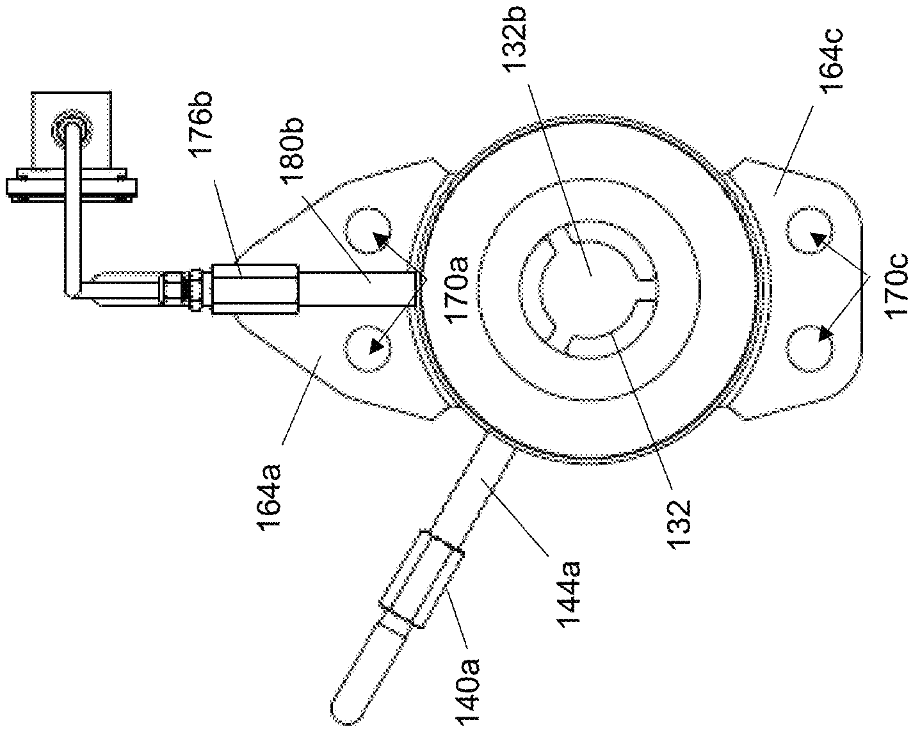
FIG. 1C shows an outlet end view of the mixing apparatus of FIG. 1A.
Figure 1B:
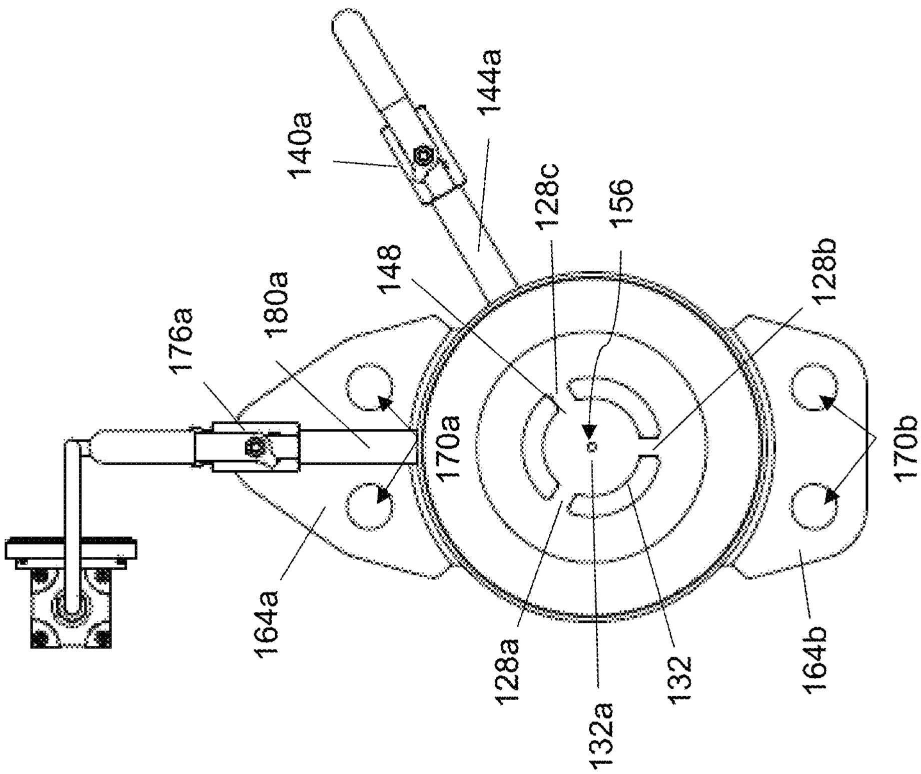
FIG. 1B shows an inlet end view of the mixing apparatus of FIG. 1A.
Figure 1E:
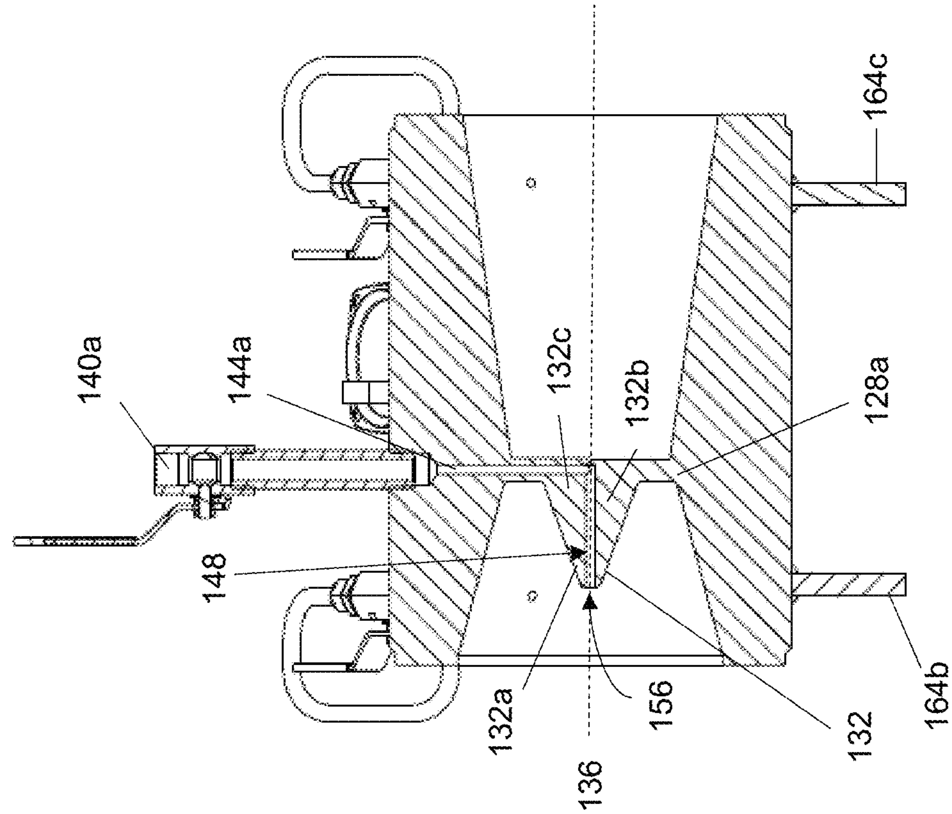
FIG. 1E shows a cross-sectional side view of the mixing apparatus of FIG. 1A taken along a plane passing through an injection passage defined by the mixing body.
Figure 1D:
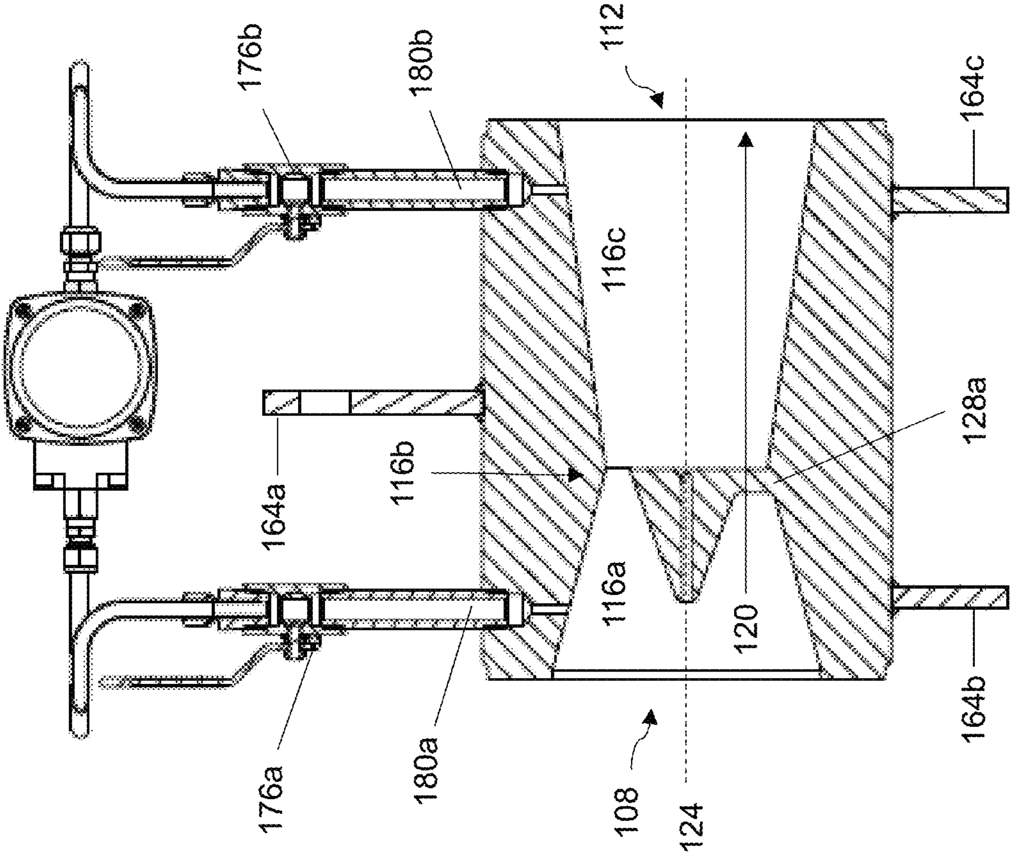
FIG. 1D shows a cross-sectional side view of the mixing apparatus of FIG. 1A taken along a plane passing through differential pressure ports defined by the mixer body.
Figure 1F:
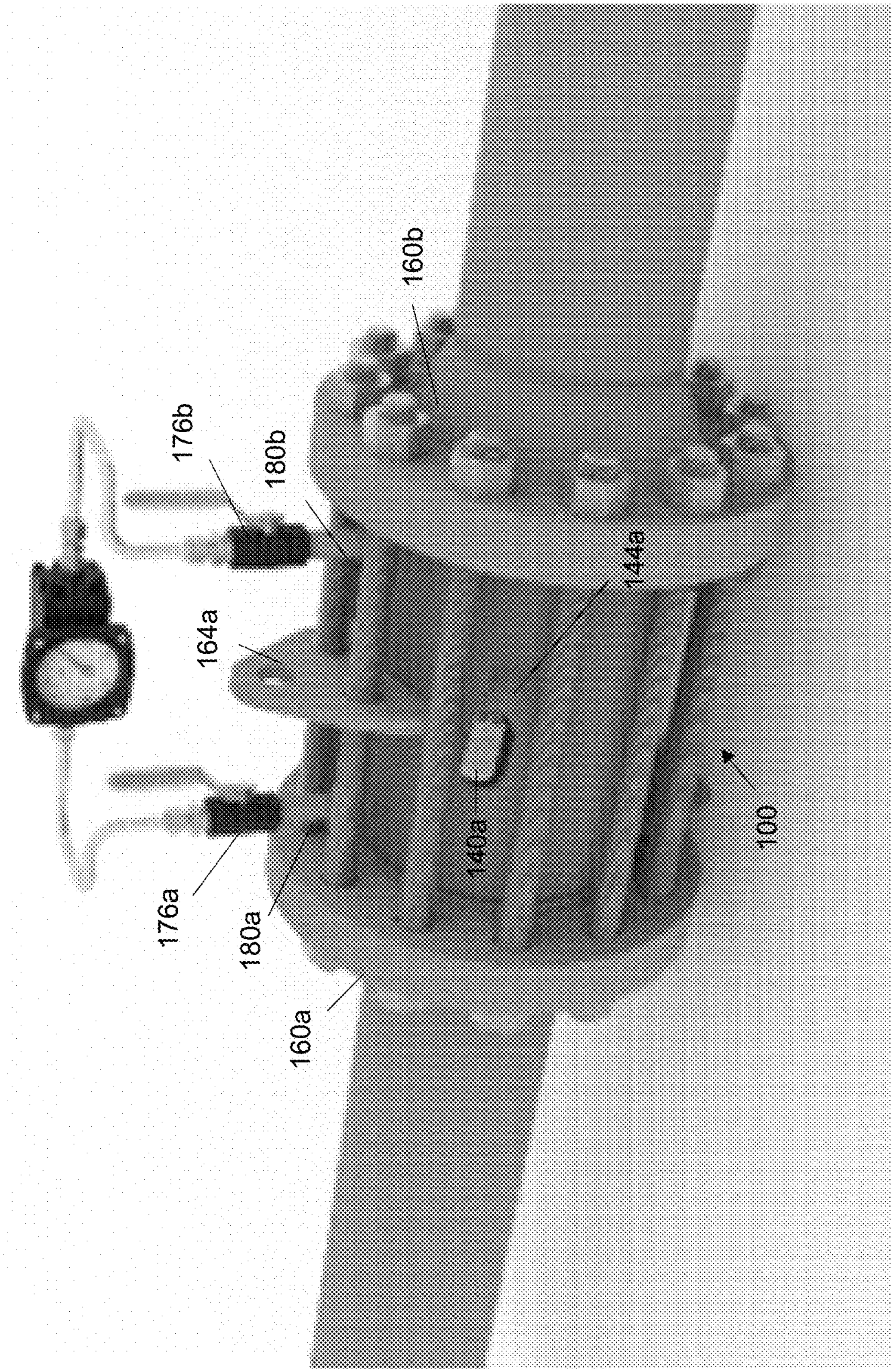
FIG. 1F shows a perspective view of the mixing apparatus of FIG. 1A.

Referring now to the drawings, and more particularly to FIGS. 1A-1F, FIG. 1A shows an isometric view of an embodiment of the present mixing apparatuses with integrally formed differential pressure ports and an injection inlet; FIG. 1B shows an inlet end view of the mixing apparatus of FIG. 1A; FIG. 1C shows an outlet end view of the mixing apparatus of FIG. 1A; FIG. 1D shows a cross-sectional side view of the mixing apparatus of FIG. 1A taken along a plane passing through differential pressure ports defined by the mixer body; FIG. 1E shows a cross-sectional side view of the mixing apparatus of FIG. 1A taken along a plane passing through an injection passage defined by the mixing body; FIG. 1F shows a perspective view of the mixing apparatus of FIG. 1A; and FIGS. 3A, 3B, and 3C respectively show perspective, side, and bottom views of the mixing apparatus of FIG. 1A assembled between two flanges.

In some embodiments, such as the one shown in FIGS. 1A-1F and FIGS. 3A-3C, mixing apparatus 100 comprises: a mixer body 104 having an exterior surface 104*a* and an interior surface 104*b*. As shown, mixer body 104 defines an inlet 108 and an outlet 112. In the depicted embodiment, interior surface 104*b* defines a flow passage 116 extending between inlet 108 and outlet 112 to permit a first fluid to flow sequentially through inlet 108, flow passage 116, and outlet 112.

As best illustrated in FIGS. 1D and 1E, in a direction 120 of flow, a first portion 116*a* of flow passage 116 narrows from inlet 108 to a point of constriction 116*b*; and, in direction 120, a second portion 116*c* of flow passage 116 expands from point of constriction 116*b* to outlet 112. As shown, a channel axis 124 extends longitudinally through the center of first and second portions 116*a*, 116*c* of flow passage 116. The narrowing of first portion 116*a* reduces the available cross-sectional area in passage 116 for fluid to flow, and thereby accelerates the fluid in the direction of flow (120). Conversely, the expansion of second portion 116*c* increases the available cross-sectional area in passage 116 for fluid to flow, and thereby permits the fluid to decelerate.

In the depicted embodiment, flow passage 116 has a substantially circular cross-section such that first portion 116*a* narrows linearly to define a frusto-conical profile, and second portion 116*c* expands linearly to define a second frusto-conical profile. As shown in FIGS. 1D and 1E, each of first and second portions 116*a*, 116*c* define a linear cross-sectional profile that is angled relative to axis 124. For example, first portion 116*a* may taper linearly toward axis 124 at an angle of 1, 2, 3, 4, 5, 6, 7, 8, 9, 10, 11, 12, 13, 14, 15, 16, 17, 18, 19, or 20 degrees relative to axis 124; and/or second portion 116*c* may taper linearly away from axis 124 at an angle of 1, 2, 3, 4, 5, 6, 7, 8, 9, 10, 11, 12, 13, 14, 15, 16, 17, 18, 19, or 20 degrees relative to axis 124. In some embodiments, such as the one shown, first portion 116*a* narrows linearly toward axis 124 in direction 120 at a greater angle relative to axis 124, than the angle relative to axis 124 at which second portion 116*c* expands linearly away from axis 124 in direction 120.

In the embodiment shown; mixer body 104 also defines a plurality of support arms 128*a*, 128*b*, 128*c*, that are unitary (i.e., formed as a single, monolithic piece of material) with the mixer body 104 and that extend radially inward from interior surface 104*b*. In this embodiment, arms 128*a*, 128*b*, 128*c* are disposed in first portion 116*a* of passage 116, but in other embodiments, may be disposed in second portion 116*b* (e.g., with a central portion extending forward to support the flow member described below).

In the embodiment shown, mixing apparatus 100 also comprises a substantially conical flow member 132 coupled to support arms 128*a*, 128*b*, 128*c*. In this embodiment, flow member 132 has a leading end 132*a*, a base 132*b* opposite the leading end 132*a*, and a peripheral surface 132*c* extending between the leading end 132*a* and the base 132*b*. A flow axis 136 extends through respective centers of leading end 132*a* and base 132*b*, and flow member 132 is coupled to support arms 128*a*, 128*b*, 128*c*, such that leading end 132*a* faces inlet 108 of mixer body 104, base 132*b* faces outlet 112 of the mixer body 104, and flow axis 136 is substantially parallel to (e.g., collinear with, as shown) channel axis 124. In other embodiments, the flow member may be substantially pyramidal.

In some embodiments, such as the one shown, mixer body 104 defines at least one body injection passage 144*a* extending from an injection inlet 140*a* on exterior surface 104*a* of mixer body 104, through one of the support arms (e.g., 128*a*, 128*b*, 128*c*). Additionally; flow member 132 defines a flow member injection passage 148 extending through at least a portion of flow member 132 to an injection outlet 156 defined at leading end 132 or peripheral surface 132*c* of flow member 132 (e.g., at leading end 132, as shown). Flow member 132 is coupled to the support arms (e.g., 128*a*, 128*b*, 128*c*) such that injection inlet 140*a* is in fluid communication with injection outlet 156 via mixer body injection passage 144*a* and flow member injection passage 148. For example, in the embodiment shown, flow member 132 is unitary with support arms (128*a*, 128*b*, 128*c*) and mixer body 104, such that mixer body injection passage 144*a* and flow member injection passage 148 are two portions of a common passage. In other embodiments, part or all of the flow member 132 may be separately coupled to the support arms (e.g., 128*a*, 128*b*, 128*c*) to also bring the flow member injection passage 148 into fluid communication with the mixer body injection passage 144*a*. In the embodiment shown, mixer body 104 also defines two differential pressure ports 176*a*, 176*b* extending from two pressure outlets 180*a*, 180*b* on exterior surface 104*a* of mixer body 104. In some embodiments, first differential pressure port 176*a* is configured to be in fluid communication with first portion 116*a* of passage 116 and second differential pressure port 176*b* is configured to be in fluid communication with second portion 116*c* of passage 116.

In other embodiments, injection outlet 156 may be disposed on peripheral surface 132*c* of flow member 132. For example, the mixer body injection passage may extend radially inward through support arm 128*a*, and flow member injection passage may continue radially across the flow member to an injection outlet on the peripheral surface circumferentially between support arms 128*b* and 128*c* (i.e., rather than extending longitudinally to the leading end).

Figure 2:
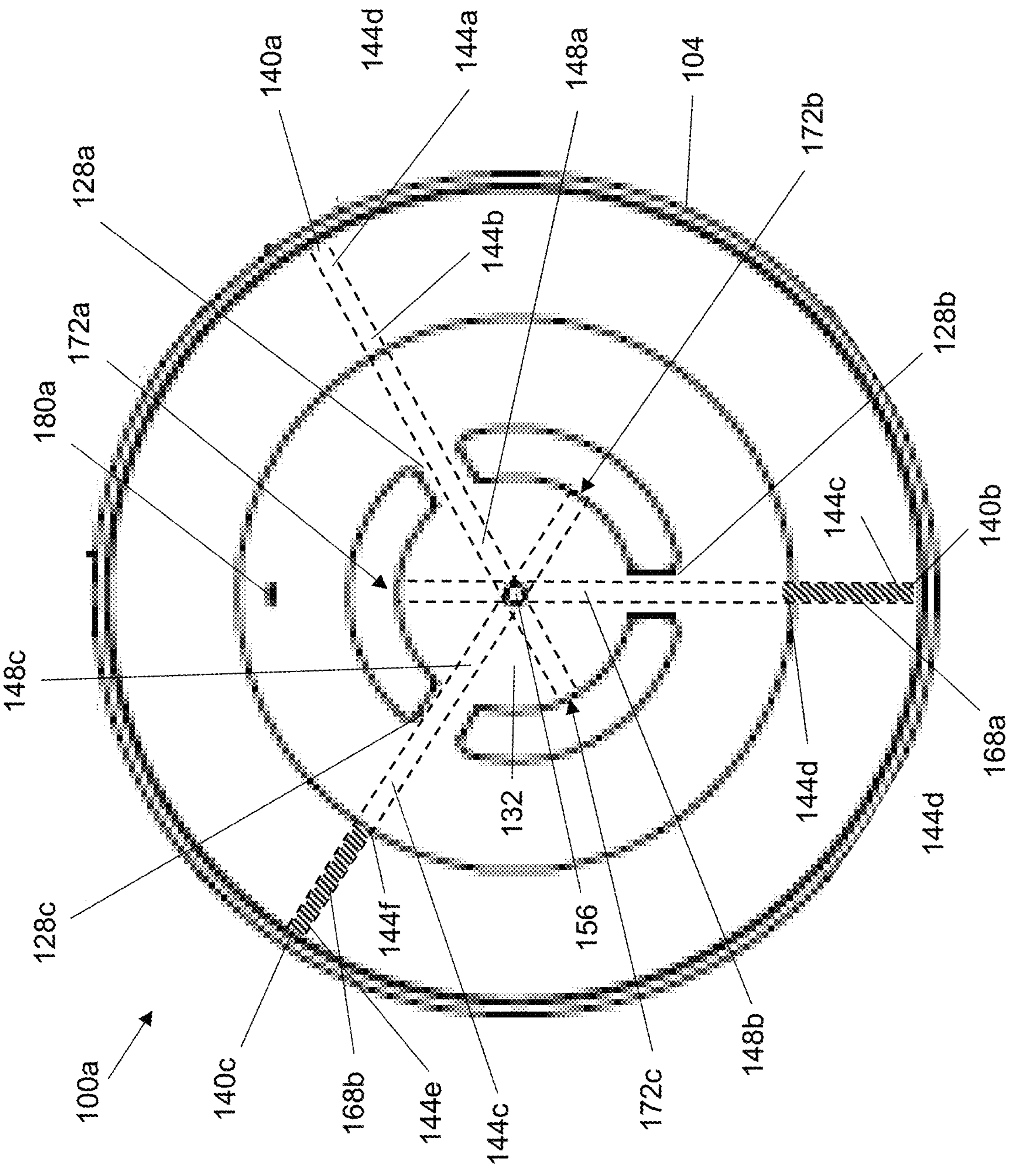
FIG. 2 shows a second embodiment of the present mixing apparatuses where one injection passage extends through each support arm to a respective injection outlet on the peripheral surface of the flow member.

Other embodiments, such as embodiment 100*a* shown in FIG. 2, may include multiple injection outlets 172*a*, 172*b*, and 172*c* on the peripheral surface of flow member 132 in addition to injection outlet 156. For example, one injection passage (e.g., 144*a*, 144*b*, or 144*c*) extending through each support arm 128*a*, 128*b*, 128*c*, to a respective injection outlet 172*a*, 172*b*, 172*c*, on the peripheral surface of the flow member between the other two support arms. In some such embodiments, the injection passages 144*a*. 144*b*. 144*c*. may intersect (e.g., within the flow member) so that all injection passages are in fluid communication; in which case, two of the injection inlets (e.g., 140*b* and 140*c* as depicted) may be plugged outward of the point of intersection with inlet plugs 168*a*, 168*b* so that fluid may be injected to all of the injection outlets via a single injection inlet (e.g., 140*a* as depicted).

As shown, mixing apparatus 100 does not include pipe flanges, and the longitudinal ends of mixer body 104 that are not threaded. Instead, in the depicted embodiment, mixer body 104 is configured to be clamped between two pipe flanges (as described below with reference to FIGS. 3A-3C). To facilitate such assembly, the mixing apparatus can include two or more flanges. For example, in the depicted embodiment, mixing apparatus 100 includes flanges 164*a*, 164*b*, and 164*c* that extend radially outward from exterior surface 104*a* of mixer body 104. In this embodiment, two of the flanges 164*b*, 164*c* are longitudinally spaced along exterior surface 104*a* of the mixer body 104. As shown, flanges (e.g., 164*a*, 164*b*, 164*c*) can define a plurality of guide openings. For example, flanges 164*b*, 164*c* define a plurality of pairs of guide openings (e.g., 170*b* and 170*c*), with each pair of guide openings (170*b*, 170*c*) being aligned along a respective guide axis 174 that is parallel to the channel axis 124 to receive a bolt that resists rotational misalignment of the mixer relative to the flanges.

Figure 4B:
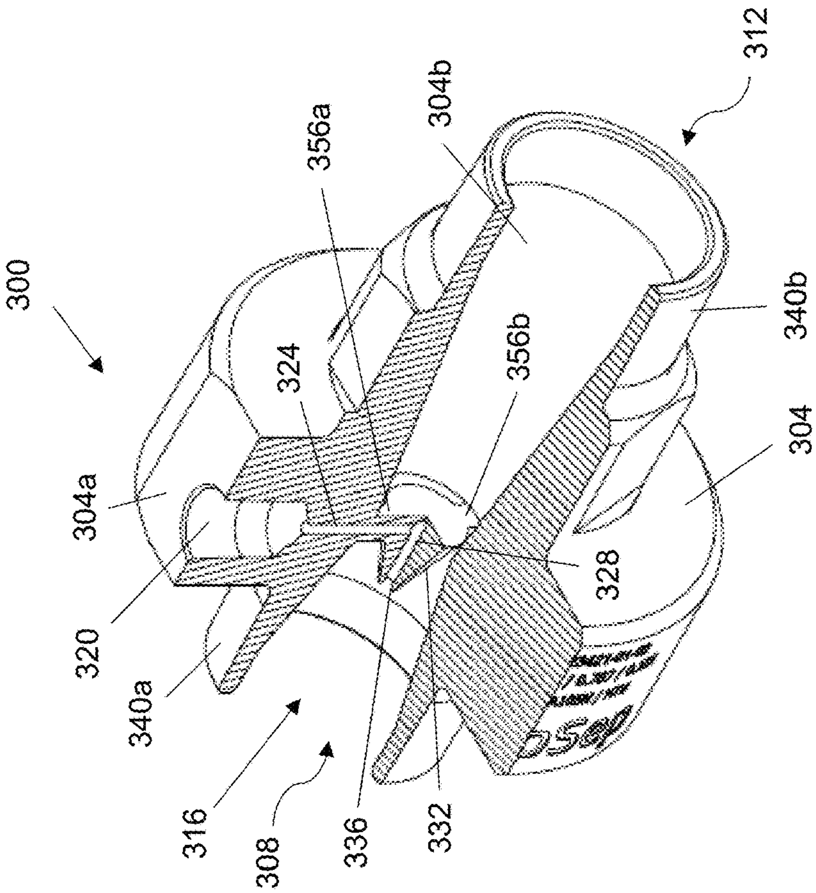
FIG. 4B shows an isometric, cut away view of the mixing apparatus of FIG. 4A with the outlet end facing toward the viewer.
Figure 4A:
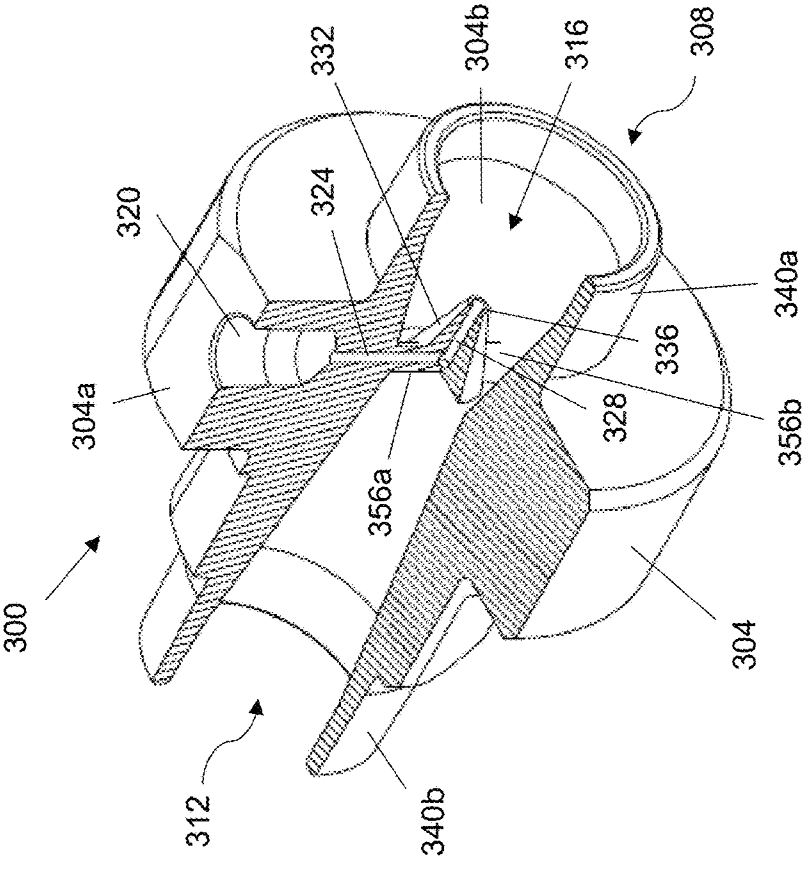
FIG. 4A shows an isometric, cut away view of an embodiment of the present mixing apparatuses with the inlet end facing toward the viewer.
Figure 4C:
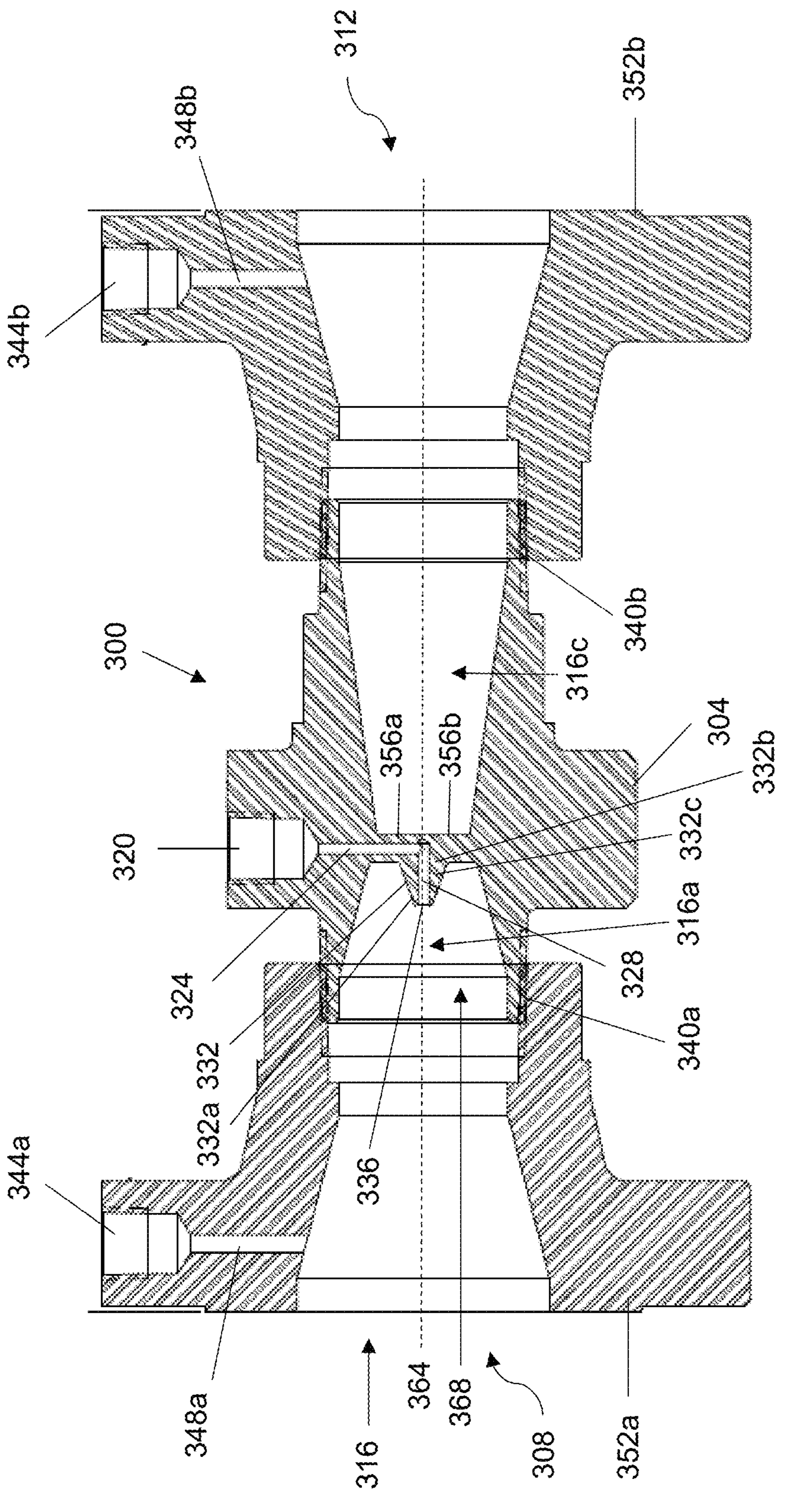
FIG. 4C shows a cross-sectional side view of the mixing apparatus of FIGS. 4A and 4B with the longitudinal ends coupled to flanges on either end.
Figure 4E:
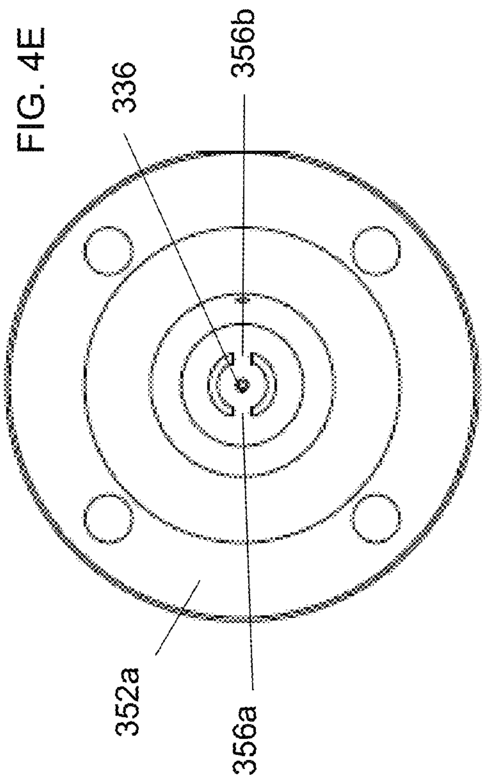
FIG. 4E shows an end view of a flange coupled to the inlet end of the mixing apparatus of FIGS. 4A and 4B.
Figure 4F:
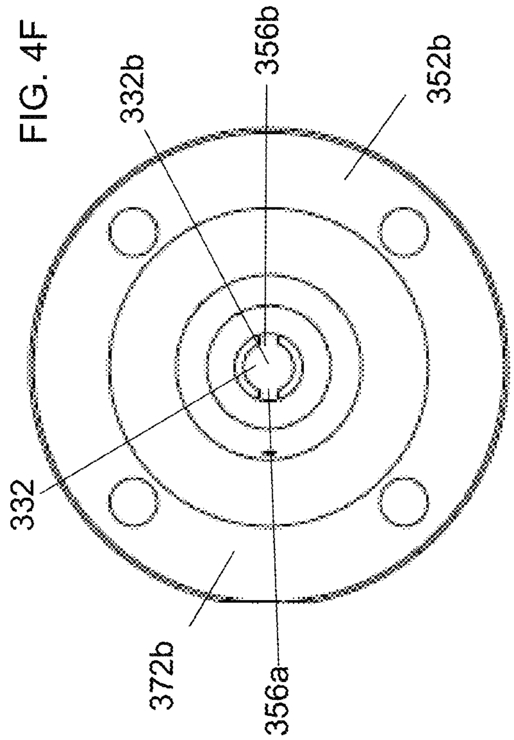
FIG. 4F shows an end view of a flange coupled to the outlet end of the mixing apparatus of FIGS. 4A and 4B.
Figure 4D:
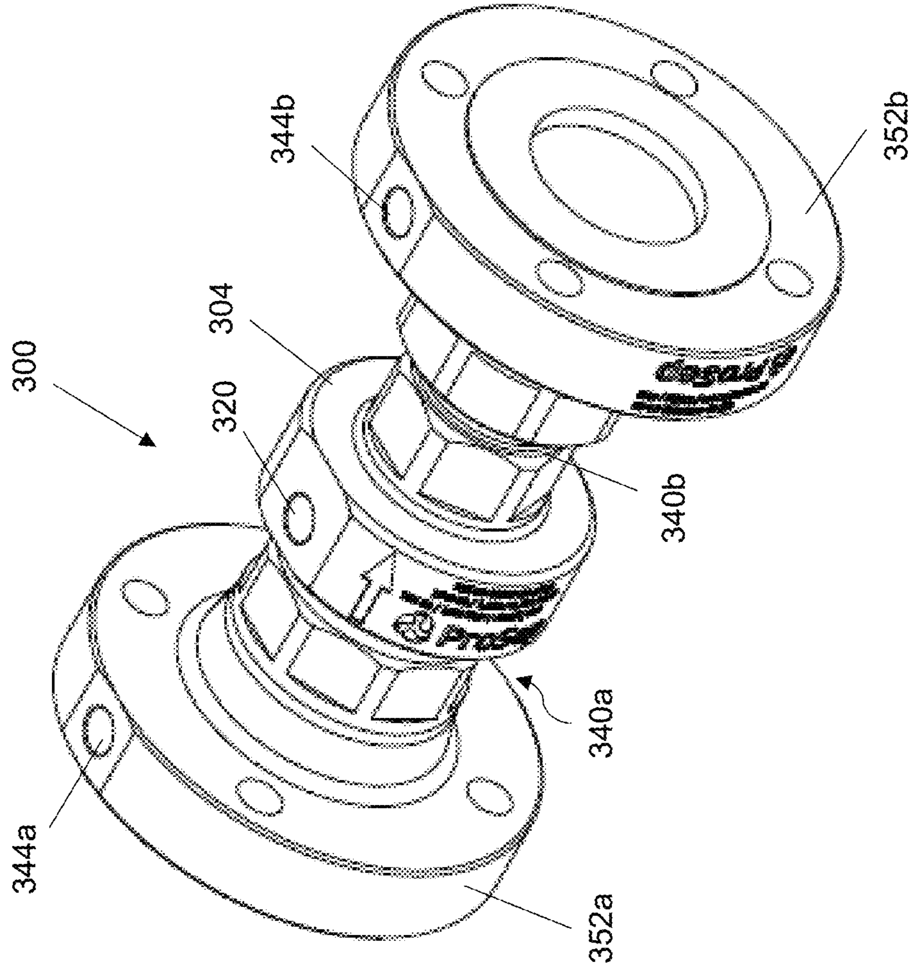
FIG. 4D shows an isometric view of the mixing apparatus of FIGS. 4A and 4B with the longitudinal ends coupled to flanges on either end.
Figure 4G:
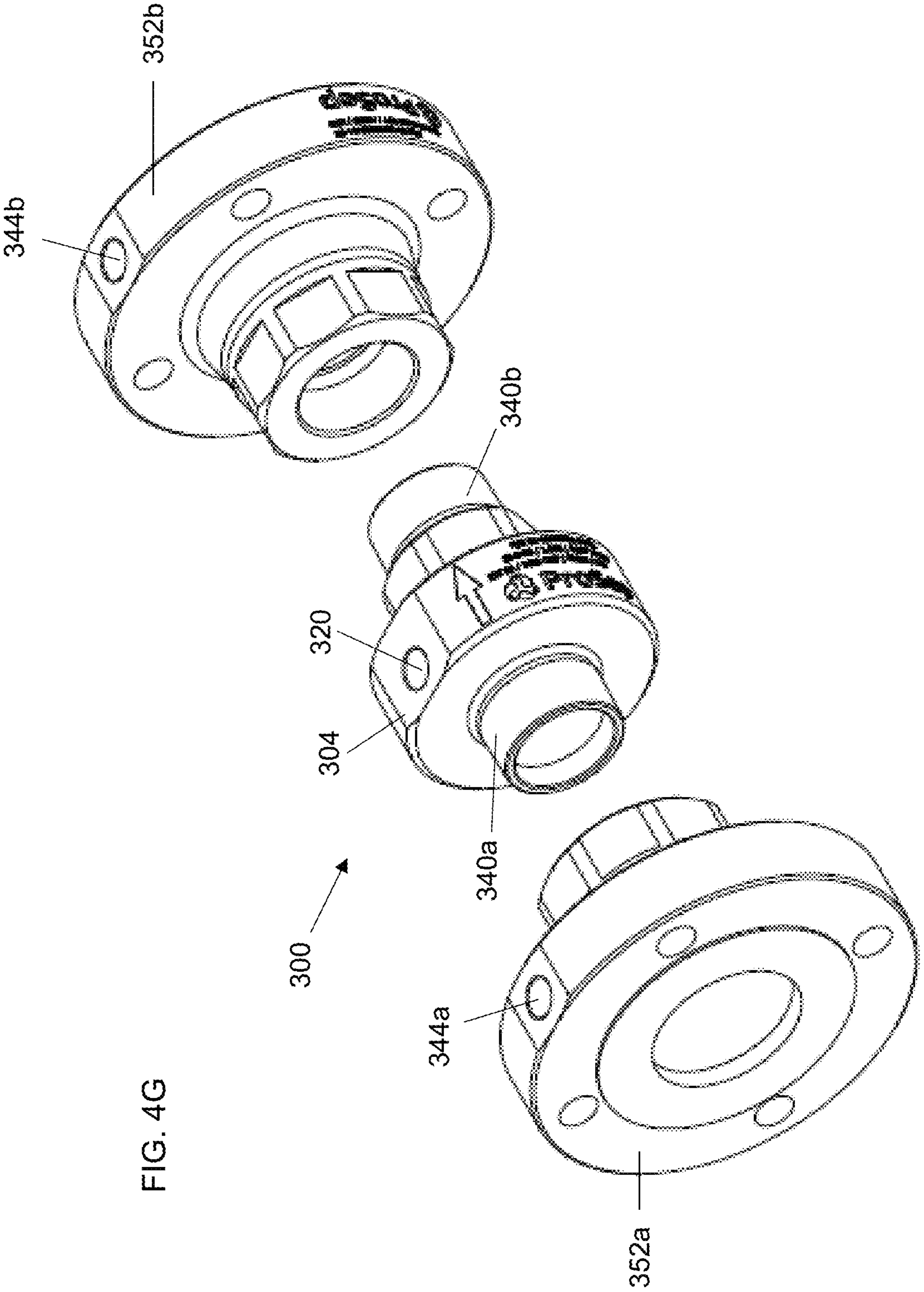
FIG. 4G shows an exploded view of the mixing apparatus of FIGS. 4A and 4B and two flanges.

Referring now to FIGS. 4A-4G, FIG. 4A shows an isometric, cutaway view of another embodiment of the present mixing apparatuses with the inlet end facing toward the viewer. FIG. 4B shows an isometric, cut away view of the mixing apparatus of FIG. 4A with the outlet end facing toward the viewer. FIG. 4C shows a cross-sectional side view of the mixing apparatus of FIGS. 4A and 4B with the longitudinal ends coupled to flanges on either end. FIG. 4D shows an isometric view of the mixing apparatus of FIGS. 4A and 4B with the longitudinal ends coupled to flanges on either end. FIG. 4E shows an end view of a flange coupled to the inlet end of the mixing apparatus of FIGS. 4A and 4B. FIG. 4F shows an end view of a flange coupled to the outlet end of the mixing apparatus of FIGS. 4A and 4B. FIG. 4G shows an exploded view of the mixing apparatus of FIGS. 4A and 4B and two flanges.

In some embodiments of the present mixing apparatuses, longitudinal ends 340*a*, 340*b* of mixer body 304 define threads configured to receive a pipe fitting and hammer union washer or flange fitting. In other embodiments of the present mixing apparatuses, such as the one shown in FIGS. 4A-4G, longitudinal ends 340*a*, 340*b* may be configured to be butt-welded or tapped. In some embodiments of the present mixing apparatuses, longitudinal ends 340*a*, 340*b* of mixer body 304 define male threads. In some embodiments of the present mixing apparatuses, the longitudinal ends 340*a*, 340*b* of mixer body 304 define female threads.

As shown in FIGS. 4A and 4B, mixer body 304 has an exterior surface 304*a* and interior surface 304*b*, where the mixer body 304 defines at least one body injection passage 324 extending from an injection inlet 320 on exterior surface 304*a* of mixer body 304, through one of the support arms (e.g., 356*a*, 356*b*). Mixer body 304 also defines longitudinal ends 340*a*, 340*b*, which may be configured to be male or female threaded, butt-welded, and/or tapped. Additionally; flow member 332 defines a flow member injection passage 328 extending through at least a portion of flow member 332 to an injection outlet 336 defined at the leading end or peripheral surface of flow member 332 (e.g., at the leading end, as shown). Flow member 332 is coupled to the support arms (e.g., 356*a*, 356*b*) such that injection inlet 320 is in fluid communication with injection outlet 336 via mixer body injection passage 324 and flow member injection passage 328. For example, in the embodiment shown, flow member 332 is unitary with support arms 356*a*, 356*b* and mixer body 304, such that mixer body injection passage 324 and flow member injection passage 328 are two portions of a common passage. In other embodiments, part or all of flow member 332 may be separately coupled to the support arms (e.g., 356*a*, 356*b*) to also bring flow member injection passage 328 into fluid communication with mixer body injection passage 324.

As best illustrated in FIGS. 4C and 4D, and further depicted in FIGS. 4E-4G, in some embodiments of the present mixing apparatuses, mixing apparatus 300 further comprises flange fittings 352a, 352b coupled to longitudinal ends 340a, 340b, each flange comprising a pressure port 344a, 344b in fluid communication with passage 316 via pressure outlet 348a, 348b. Longitudinal ends 340a, 340b may be configured to be threaded male ends, threaded female ends, butt-welded, and/or tapped ends coupled to flange fittings 352a, 352b. In this embodiment, mixing apparatus 300 is configured similarly to the mixing apparatus of FIGS. 1D and 1E, where flow passage 316 has a substantially circular cross-section such that first portion 316a narrows linearly to define a frusto-conical profile, and second portion 316c expands linearly to define a second frusto-conical profile. As shown in FIG. 4C, each of first and second portions 316a, 316c define a linear cross-sectional profile that is angled relative to axis 364. For example, first portion 316a may taper linearly toward axis 364 at an angle of 1, 2, 3, 4, 5, 6, 7, 8, 9, 10, 11, 12, 13, 14, 15, 16, 17, 18, 19, or 20 degrees relative to axis 364; and/or second portion 316c may taper linearly away from axis 364 at an angle of 1, 2, 3, 4, 5, 6, 7, 8, 9, 10, 11, 12, 13, 14, 15, 16, 17, 18, 19, or 20 degrees relative to axis 364. In some embodiments, such as the one shown, first portion 316a narrows linearly toward axis 364 in direction 368 at a greater angle relative to axis 364, than the angle relative to axis 364 at which second portion 316c expands linearly away from axis 364 in direction 368.

In the embodiment shown, mixer body 304 also defines a plurality of support arms 356a, 356b, as best illustrated in FIGS. 4E and 4F, that are unitary (i.e., formed as a single, monolithic piece of material) with mixer body 304 and that extend radially inward from the interior surface of the mixer body. As shown in FIG. 4C, support arms 356a, 356b are disposed in first portion 316a of passage 316, but in other embodiments, may be disposed in second portion 316b (e.g., with a central portion extending forward to support flow member 332).

In the embodiment shown, mixing apparatus 300 also comprises a substantially conical flow member 332 coupled to support arms 356a, 356b. In this embodiment, flow member 332 has a leading end 332a, a base 332b opposite the leading end 332a, and a peripheral surface 332c extending between the leading end 332a and the base 332b. A flow axis 364 extends through respective centers of leading end 332a and base 332b, and flow member 332 is coupled to support arms 356a, 356b, such that leading end 332a faces inlet 308 of mixer body 304, base 332b faces outlet 312 of the mixer body 304. In other embodiments, the flow member may be substantially pyramidal.

In some embodiments, such as the one shown, mixer body 304 defines at least one body injection passage 324 extending from an injection inlet 320 on exterior surface 304a of mixer body 304, through one of the support arms (e.g., 356a, 356b). Additionally; flow member 332 defines a flow member injection passage 328 extending through at least a portion of flow member 332 to an injection outlet 336 defined at leading end 332a or peripheral surface 332c of flow member 332 (e.g., at leading end 332a, as shown). Flow member 332 is coupled to the support arms (e.g., 356a, 356b) such that injection inlet 320 is in fluid communication with injection outlet 336 via mixer body injection passage 324 and flow member injection passage 328. For example, in the embodiment shown, flow member 332 is unitary with support arms (356a, 356b) and mixer body 304, such that mixer body injection passage 324 and flow member injection passage 328 are two portions of a common passage. In other embodiments, part or all of flow member 332 may be separately coupled to the support arms (e.g., 356a, 356b) to also bring the flow member injection passage 328 into fluid communication with the mixer body injection passage 324. In the embodiment shown, flange fittings 352a, 352b each define a pressure port 344a, 344b extending from two respective pressure outlets 348a, 348b on the exterior surface of flange fittings 352a, 352b.

In other embodiments, injection outlet 336 may be disposed on peripheral surface 332c of flow member 332. For example, the mixer body injection passage 324 may extend radially inward through support arm 356a, and flow member injection passage 328 may continue radially across the flow member to an injection outlet on the peripheral surface of the flow member (i.e., rather than extending longitudinally to the leading end).

Figure 5A:
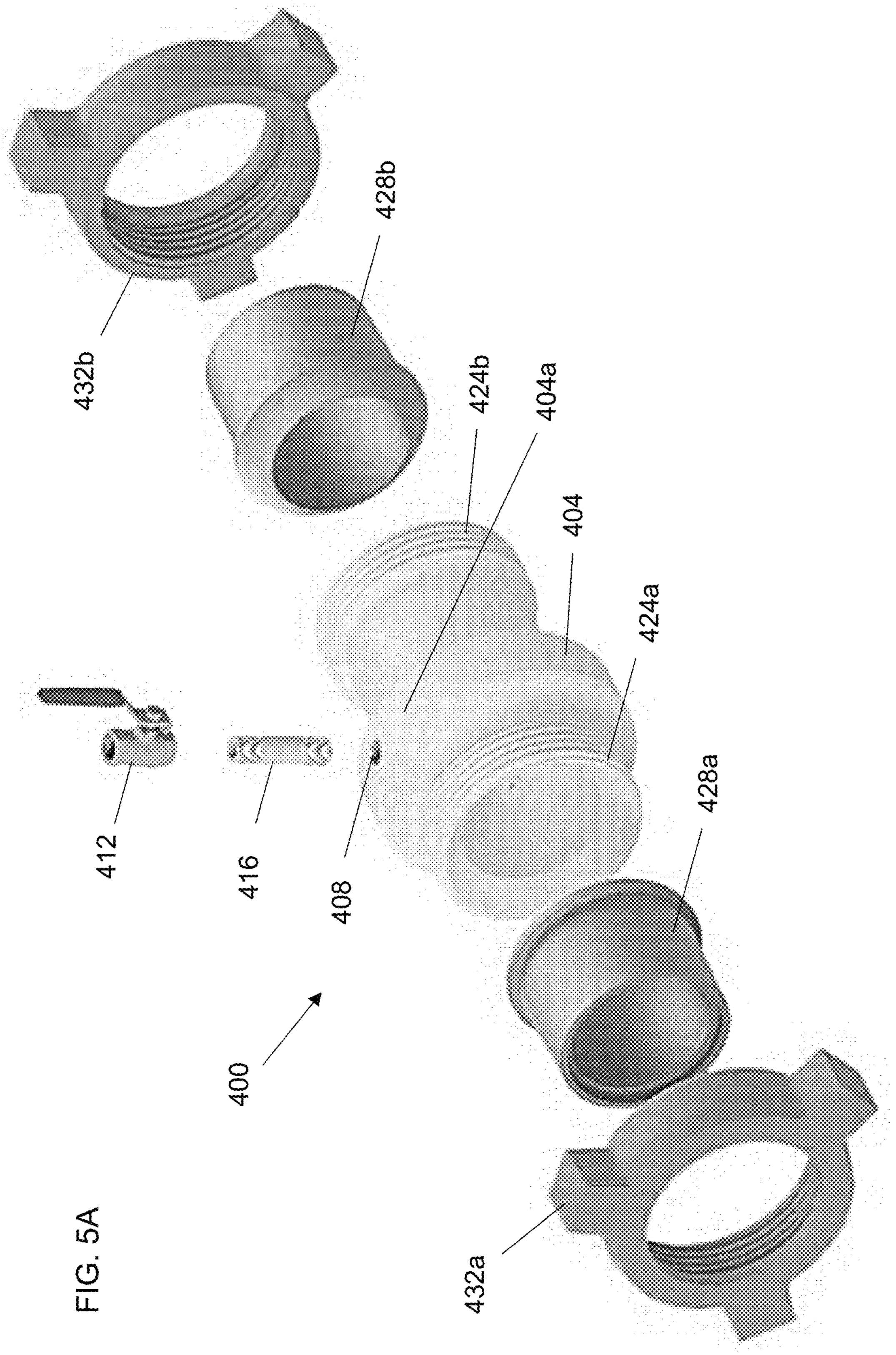
FIG. 5A shows an exploded perspective view of an embodiment of the present mixing apparatuses configured to receive a pipe fitting and hammer union washer.
Figure 5B:
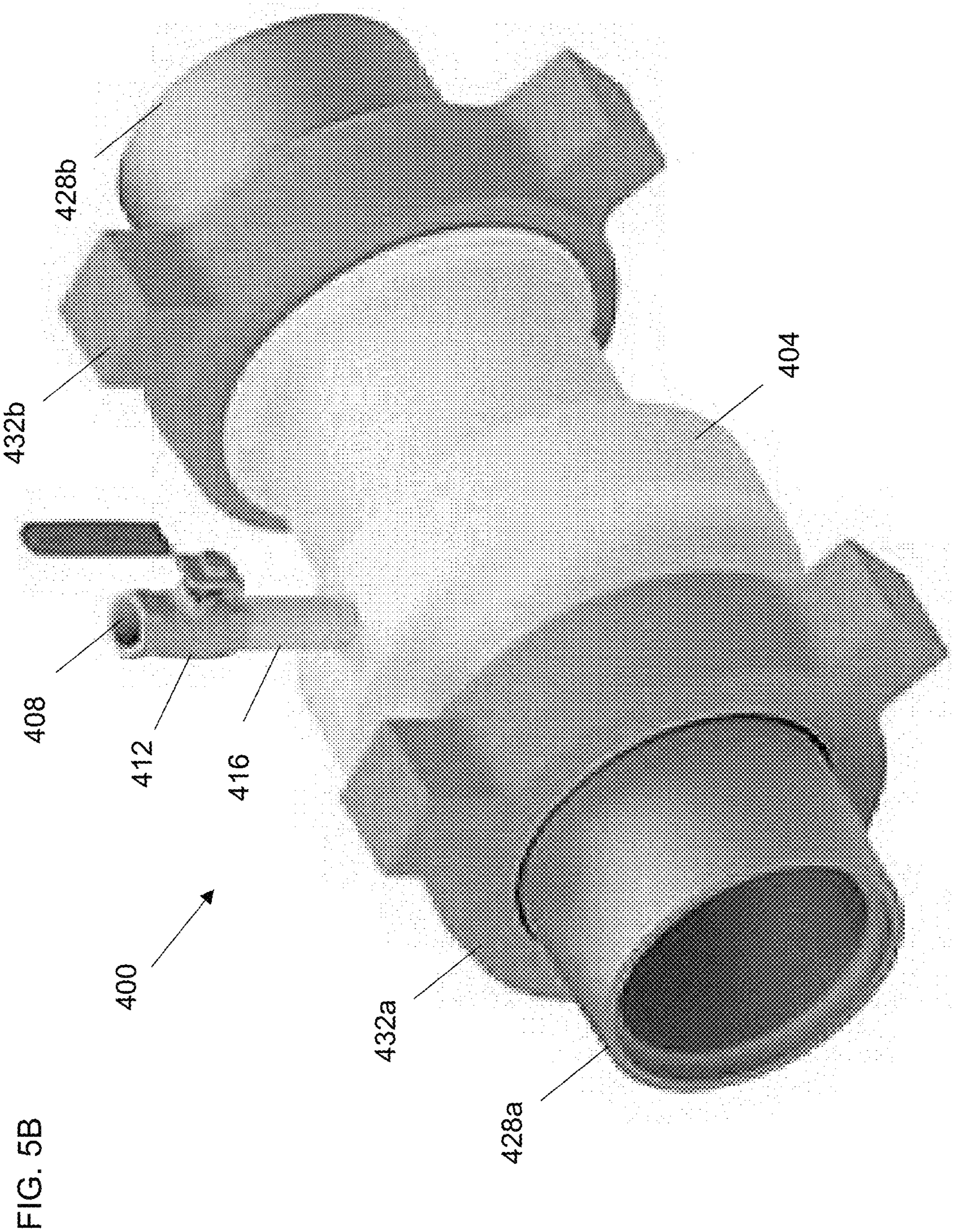
FIG. 5B shows an assembled perspective view of the mixing apparatus of FIG. 5A.

Referring now to FIGS. 5A-5B, FIG. 5A shows an exploded perspective view of an embodiment of the present mixing apparatuses configured to receive a pipe fitting and hammer union washer. FIG. 5B shows an assembled perspective view of the mixing apparatus of FIG. 5A.

In some embodiments of the present mixing apparatuses, longitudinal ends 424a, 424b, of mixer body 404 define hammer union joints. As shown in FIG. 5A, mixer body 404 is similar internally to the mixer body in FIGS. 4A and 4B, but longitudinal ends 424a, 424b, are configured as threaded male hammer union ends configured to receive locking nuts 432a, 432b. Longitudinal ends 424a, 424b, may also be configured as threaded female ends or other types of pipe fitting ends for hammer union joints. As shown in FIG. 5A, pipe fittings 428a, 428b, are configured to be slideably engaged with respective longitudinal ends 424a, 424b. Locking nuts 432a, 432b are then tightened over longitudinal ends 424a, 424b, to secure pipe fittings 428a, 428b to form mixing apparatus assembly 400 as shown in FIG. 5B. In some embodiments, mixer body 404 defines at least one body injection passage extending from an injection inlet 408 on exterior surface 404a of mixer body 404, coupled to injection passage sleeve 416. Injection inlet valve 412 is coupled to injection passage 416 to permit an open and close position for injection of fluid.

Figure 6A:
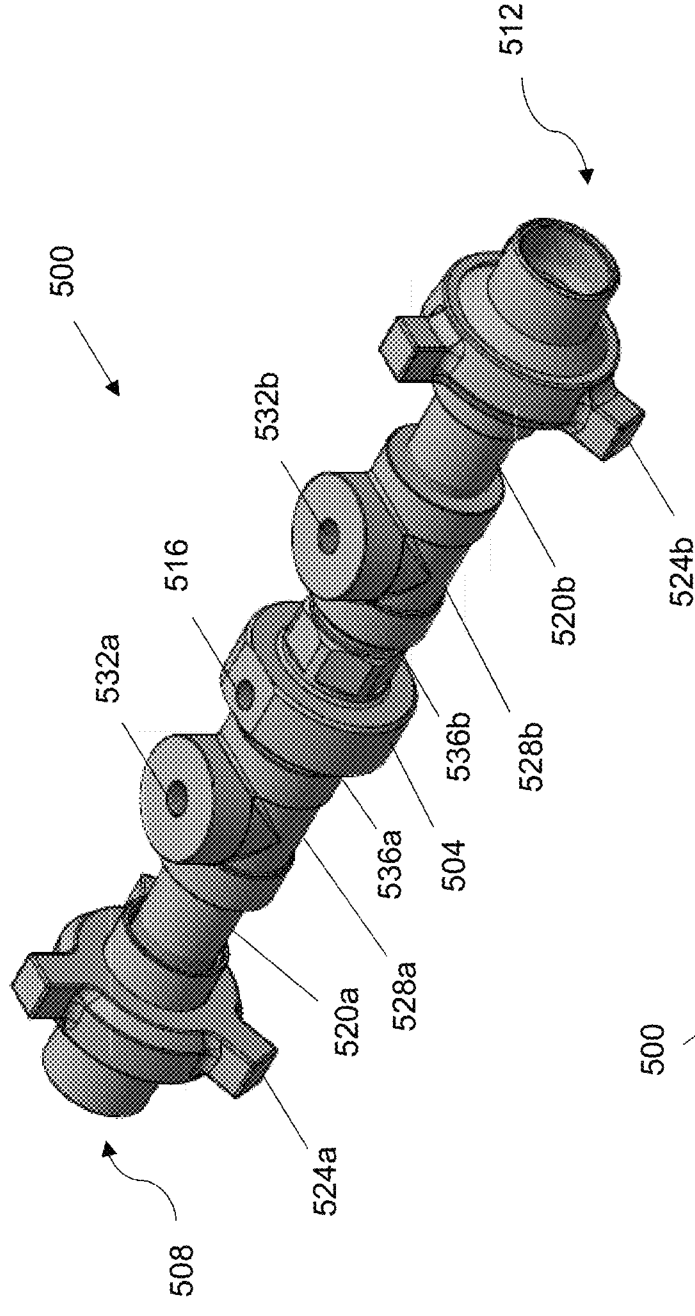
FIG. 6A shows an isometric view of the mixing apparatus of FIGS. 5A and 5B assembled with hammer union pipe fittings configured with external pressure ports.
Figure 6B:
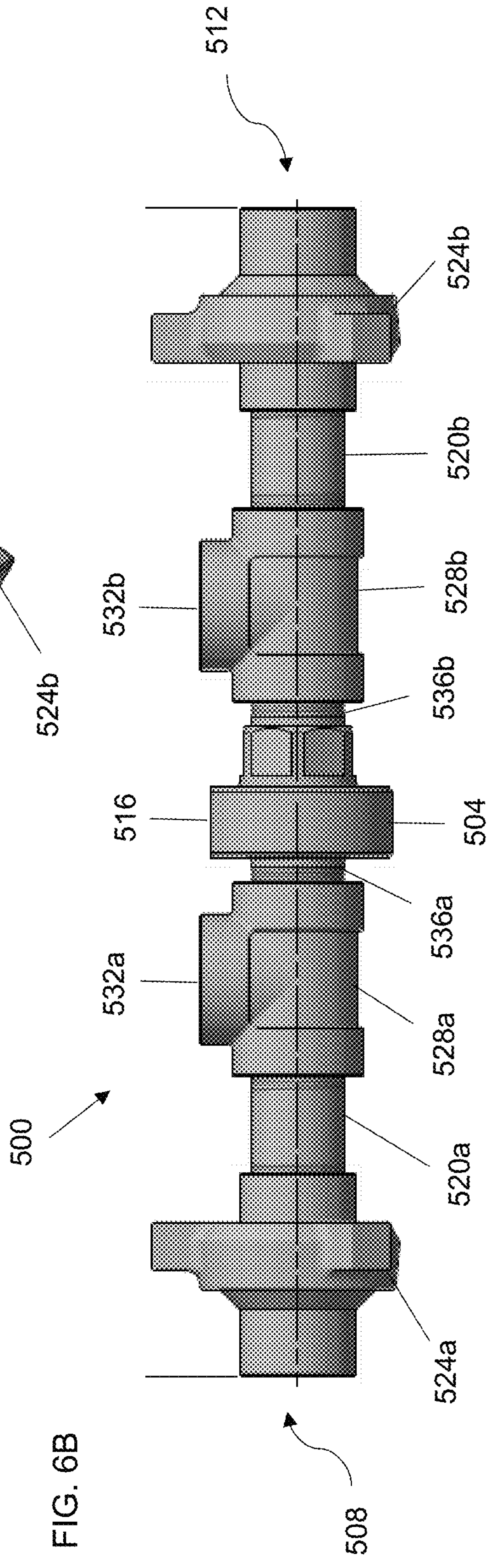
FIG. 6B shows a side view of the mixing apparatus assembly of FIG. 6A.

Referring now to FIGS. 6A-6B, FIG. 6A shows an isometric view of the mixing apparatus of FIGS. 4A and 4B assembled with hammer union pipe fittings configured with external pressure ports. FIG. 6B shows a side view of the mixing apparatus assembly of FIG. 6A.

As shown in FIGS. 6A, and 6B, mixer body 504 is similar internally to the mixer body in FIGS. 5A and 5B, but longitudinal ends 536a, 536b, of mixer body 504 are configured as threaded male ends coupled to female threaded pipe tees 528a, 528b with external pressure ports 532a, 532b. In some embodiments, external pressure ports 532a, 532b may be omitted from the pipe tees. In some embodiments, such as the one shown, male threaded pipe fittings 520a, 520b are coupled to pipe tees 528a, 528b. Locking nuts 524a, 524b are then tightened over the ends of the male threaded pipe fittings to secure mixing apparatus assembly 500.

Figure 7B:
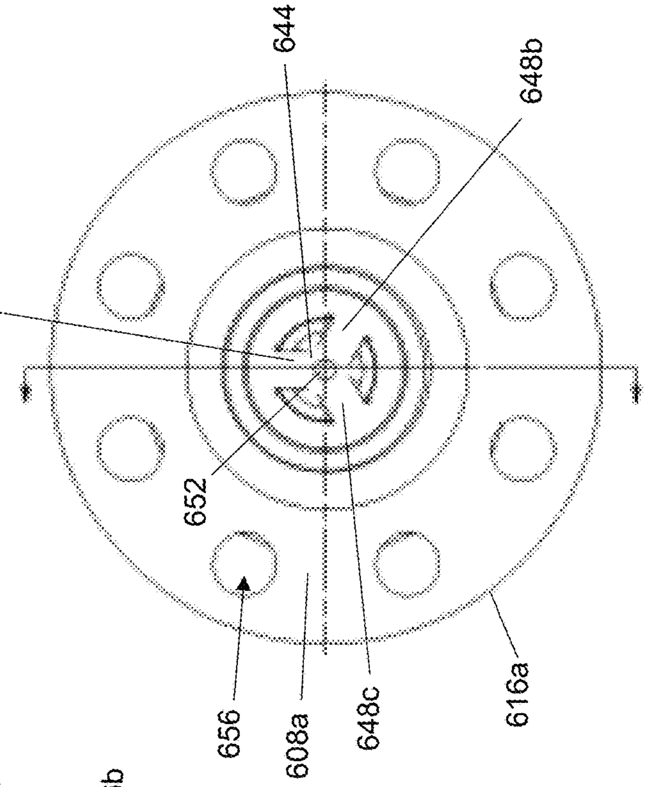
FIG. 7B shows an inlet end view of the mixing apparatus assembly of FIG. 7A.
Figure 7A:
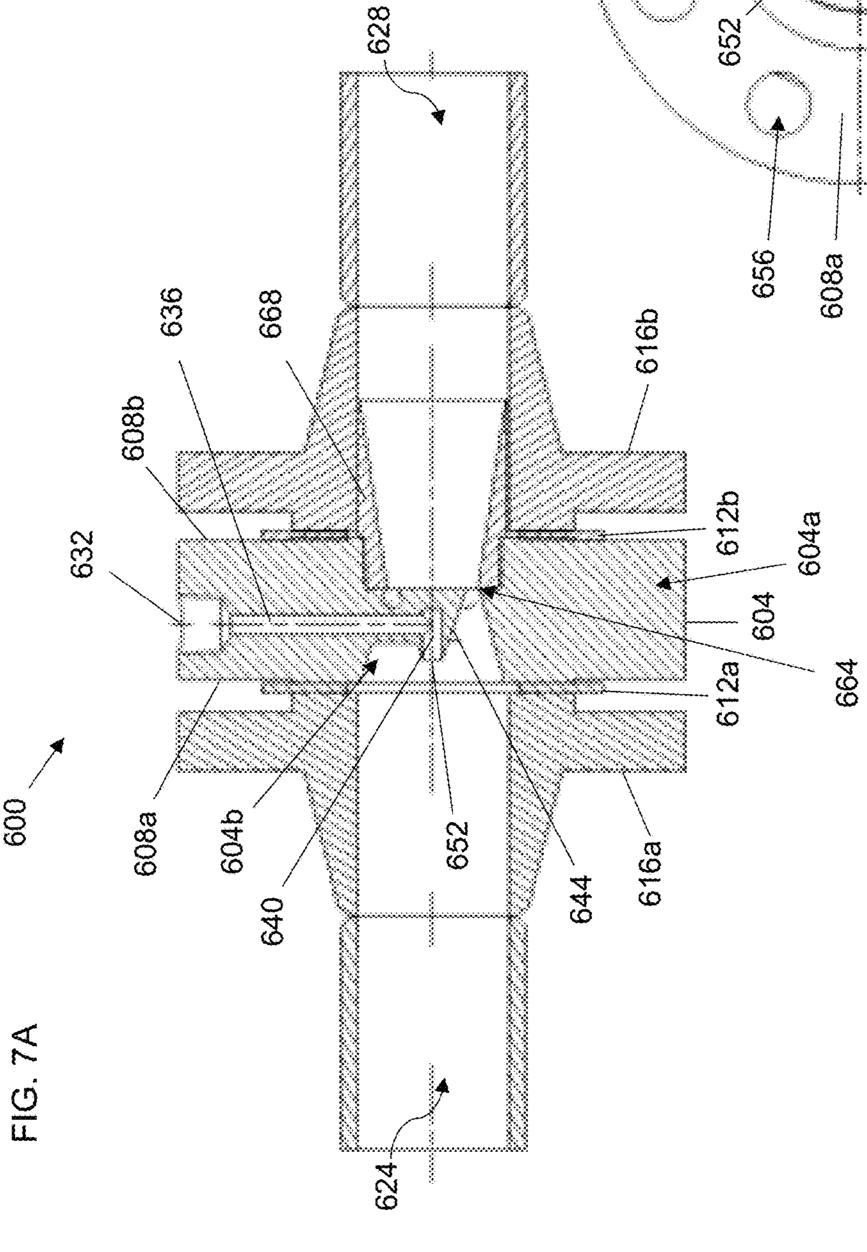
FIG. 7A shows a cross-sectional side view of an embodiment of the present mixing apparatuses assembled between two flange fittings taken along a plane passing through an injection passage defined by the mixing body.
Figure 7D:
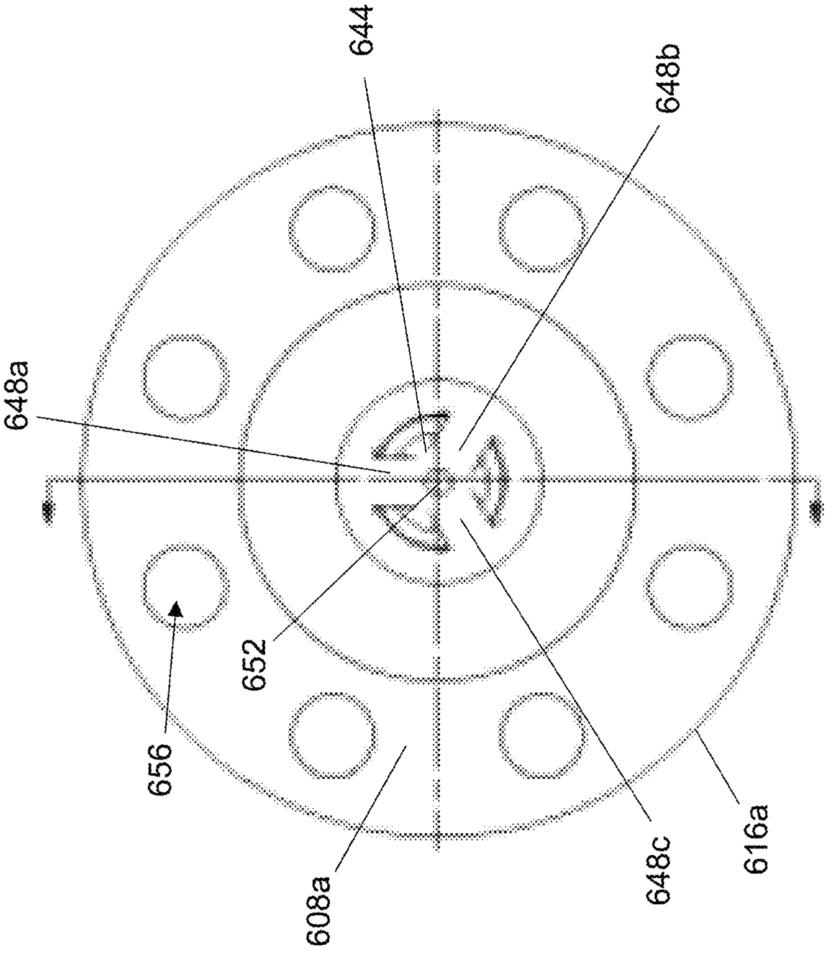
FIG. 7D shows an inlet end view of the mixing apparatus of FIG. 7C.
Figure 7C:
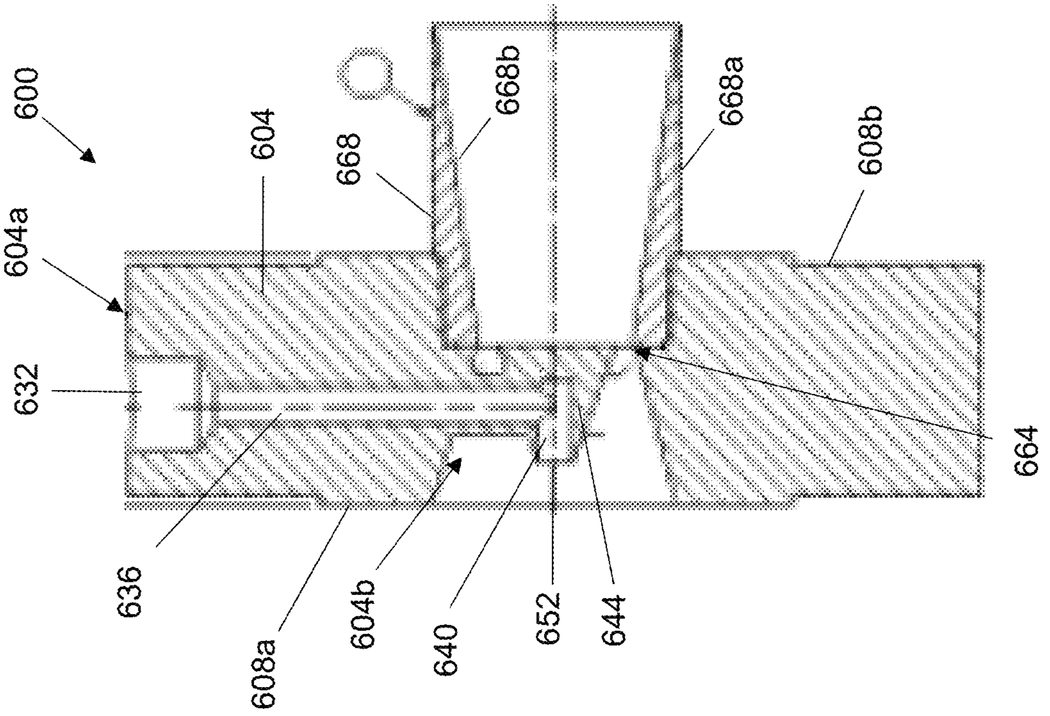
FIG. 7C shows a cross-sectional side view of the mixing apparatus of FIG. 7A taken along a plane passing through an injection passage defined by the mixing body.
Figure 7E:
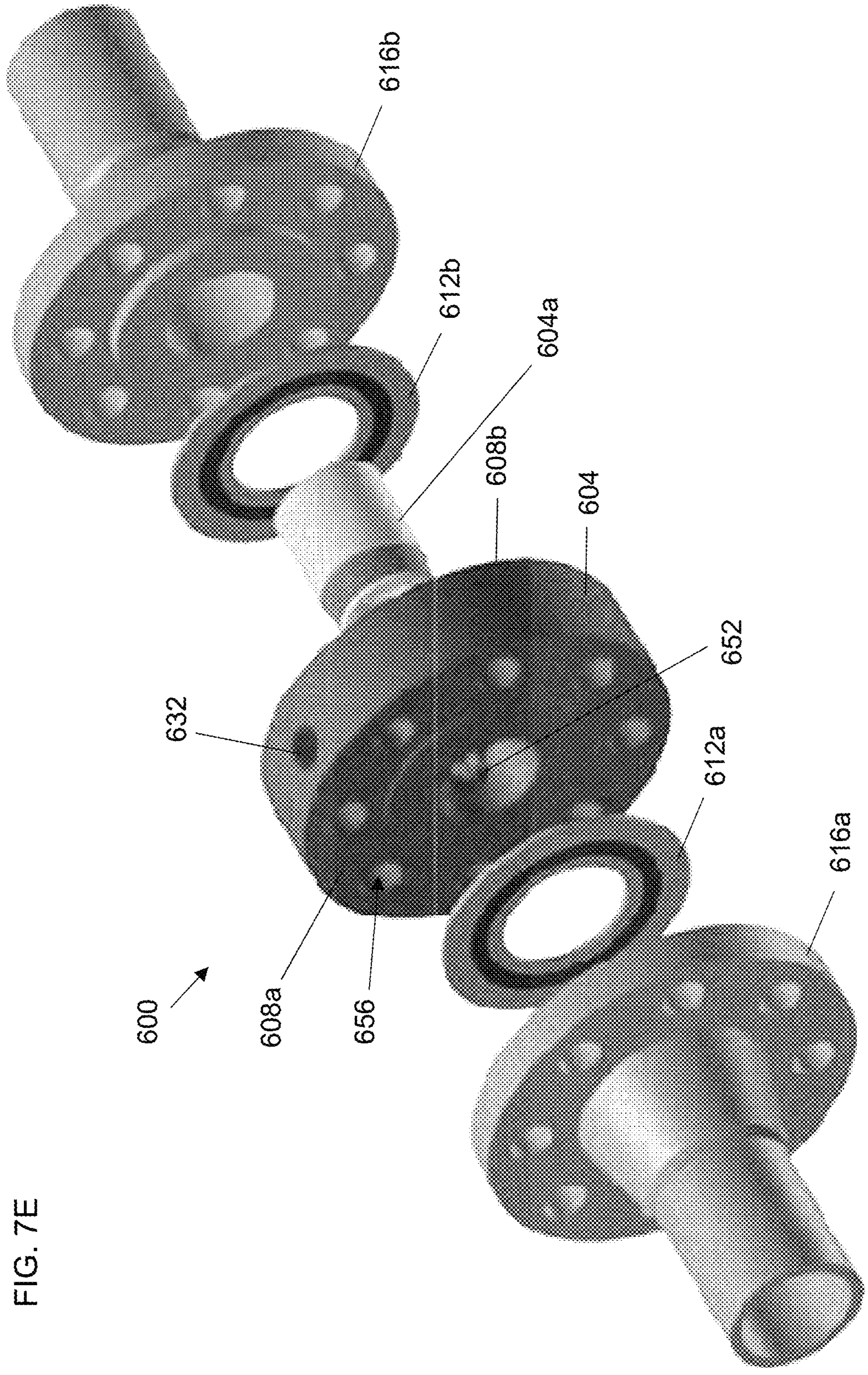
FIG. 7E shows an exploded perspective view of the mixing apparatus assembly of FIG. 7A.
Figure 7F:
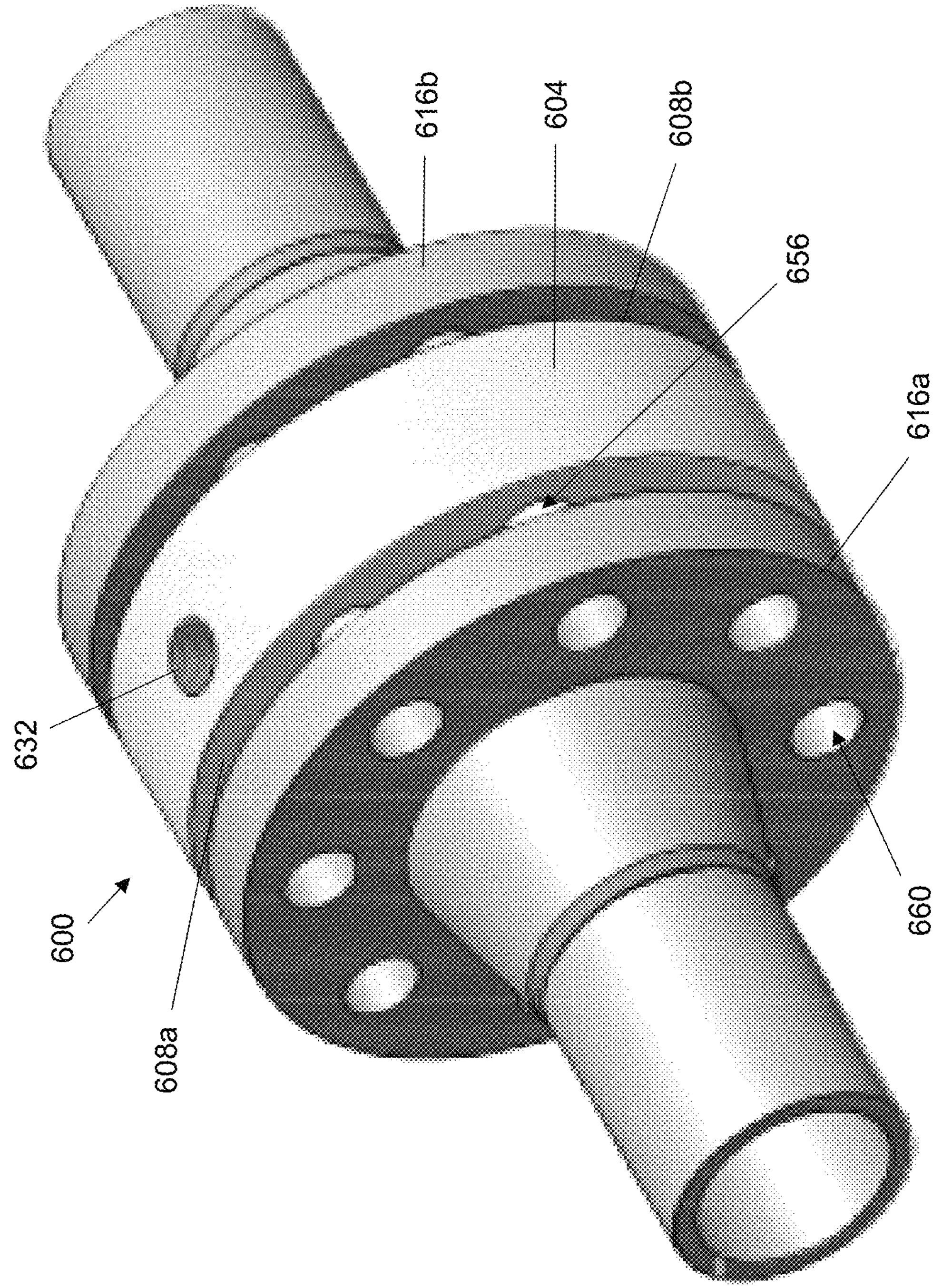
FIG. 7F shows an assembled isometric view of the mixing apparatus assembly of FIG. 7A.
Figure 7G:
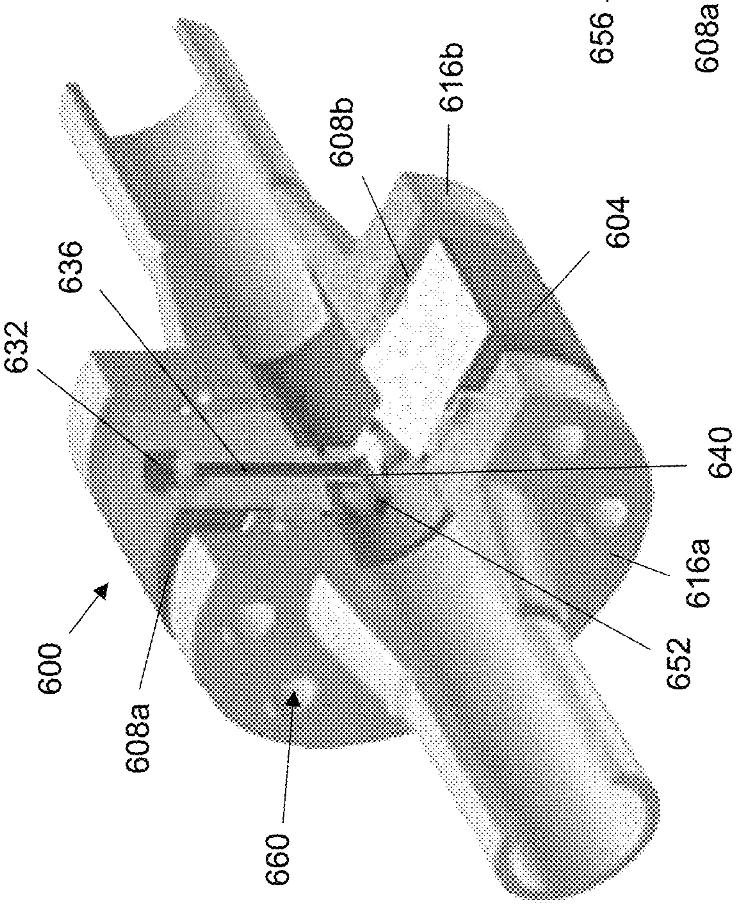
FIG. 7G shows an isometric cut-away view of the mixing apparatus assembly of FIG. 7F.
Figure 7H:
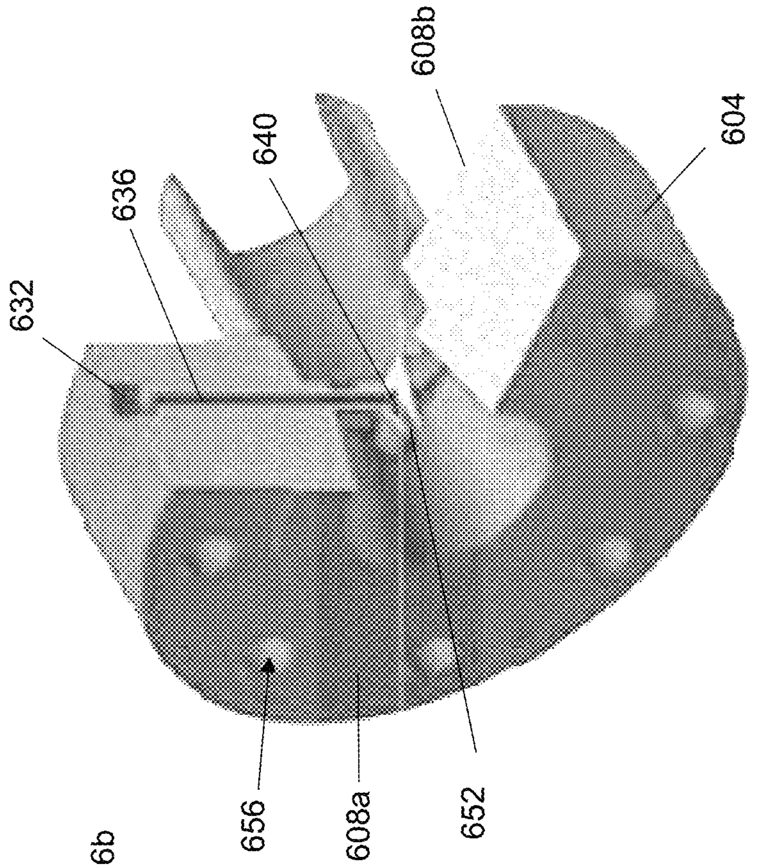
FIG. 7H shows an isometric cut-away view of the mixing apparatus of FIG. 7C.

Referring now to FIGS. 7A-7H, FIG. 7A shows a cross-sectional side view of an embodiment of the present mixing apparatuses assembled between two flange fittings taken along a plane passing through an injection passage defined by the mixing body. FIG. 7B shows an inlet end view of the mixing apparatus assembly of FIG. 7A. FIG. 7C shows a cross-sectional side view of the mixing apparatus of FIG. 7A taken along a plane passing through an injection passage defined by the mixing body. FIG. 7D shows an inlet end view of the mixing apparatus of FIG. 7C. FIG. 7E shows an exploded perspective view of the mixing apparatus assembly of FIG. 7A. FIG. 7F shows an assembled isometric view of the mixing apparatus assembly of FIG. 7A. FIG. 7G shows an isometric cut-away view of the mixing apparatus assembly of FIG. 7F. FIG. 7H shows an isometric cut-away view of the mixing apparatus of FIG. 7C.

As best illustrated in FIGS. 7B, 7D, 7E, and 7H, in some embodiments of the present mixing apparatuses, longitudinal ends of mixer body 604 define flange faces 608*a*, 608*b*. In some embodiments of the present mixing apparatuses, flange faces 608*a*, 608*b*, define a plurality of threaded holes 656 disposed radially around flange faces 608*a*, 608*b*. As shown in FIGS. 7A and 7E, to ensure a tight seal, gasket 612*a* is disposed between flange face 608*a* and flange fitting 616*a*, and gasket 612*b* is disposed between flange face 608*b* and flange fitting 616*b* to form mixing apparatus assembly 600 as shown in FIGS. 7A, 7F, 7G.

As shown in FIGS. 7A and 7C, mixer body 604 has an exterior surface 604*a*, interior surface 604*b* that narrows towards a point of constriction 664 from the inlet end 624 facing side to the outlet end 628 facing side, and an extension piece 668 coupled to the outlet facing side of mixer body 604. Extension piece 668 has an exterior surface 668*a*, an interior surface 668*b* that aligns with the interior surface 604*b* of mixer body 604 such that when the extension piece 668 is coupled to the mixer body 604, the interior surface 668*b* of the extension piece 668 expands outward from the point of constriction 664 towards the outlet end 628 facing side. Mixer body 604 also defines at least one body injection passage 636 extending from injection inlet 632 on exterior surface 604*a* of mixer body 604, through one of the support arms (e.g., 648*a*, 648*b*, 648*c*). Additionally, flow member 644 defines a flow member injection passage 640 extending through at least a portion of flow member 644 to an injection outlet 652 defined at the leading end or peripheral surface of flow member 644 (e.g., at the leading end, as shown). Flow member 644 is coupled to the support arms (e.g., 648*a*, 648*b*, 648*c*) such that injection inlet 632 is in fluid communication with injection outlet 652 via mixer body injection passage 636 and flow member injection passage 640. For example, in the embodiment shown, flow member 644 is unitary with support arms 648*a*, 648*b*, 648*c* and mixer body 604, such that mixer body injection passage 636 and flow member injection passage 640 are two portions of a common passage. In other embodiments, part or all of flow member 644 may be separately coupled to the support arms (e.g., 648*a*, 648*b*, 648*c*) to also bring flow member injection passage 640 into fluid communication with mixer body injection passage 636.

Figure 8B:
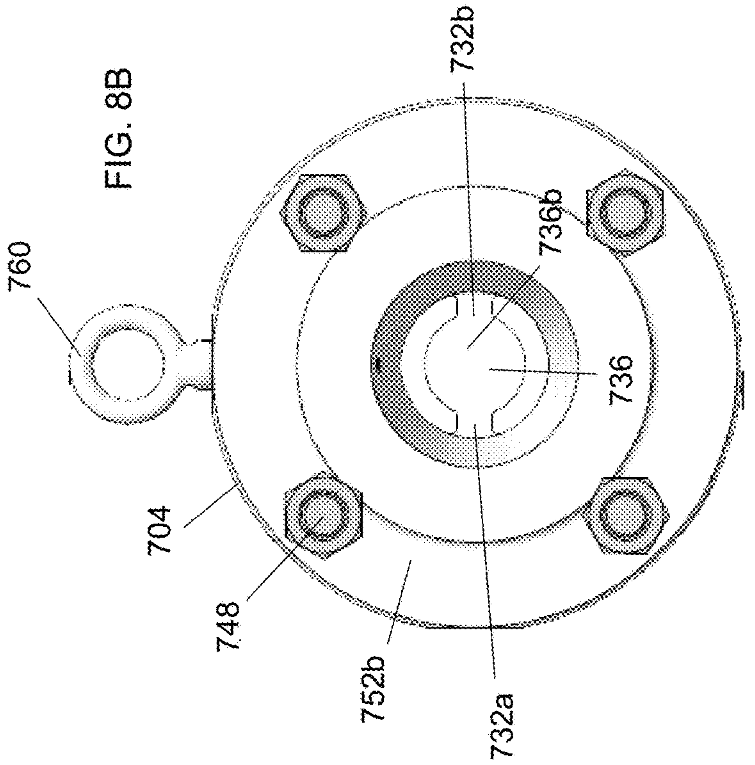
FIG. 8B shows an outlet end view of the mixing apparatus of FIG. 8A.
Figure 8A:
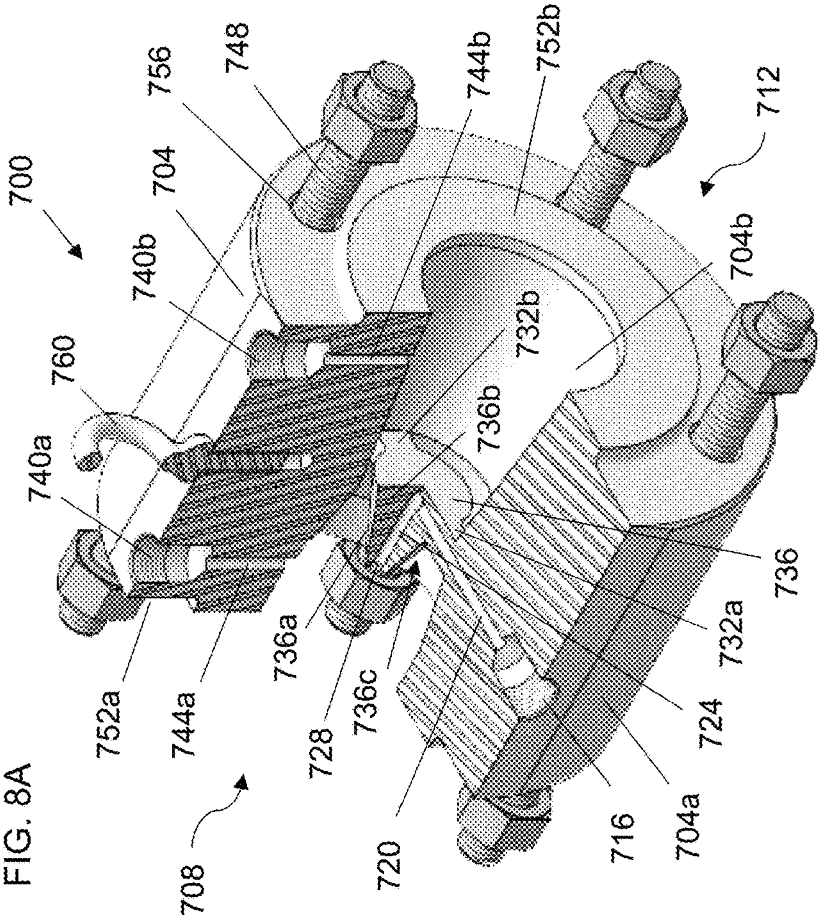
FIG. 8A shows an isometric cut-away view of an embodiment of the present mixing apparatuses with threaded studs.
Figure 8C:
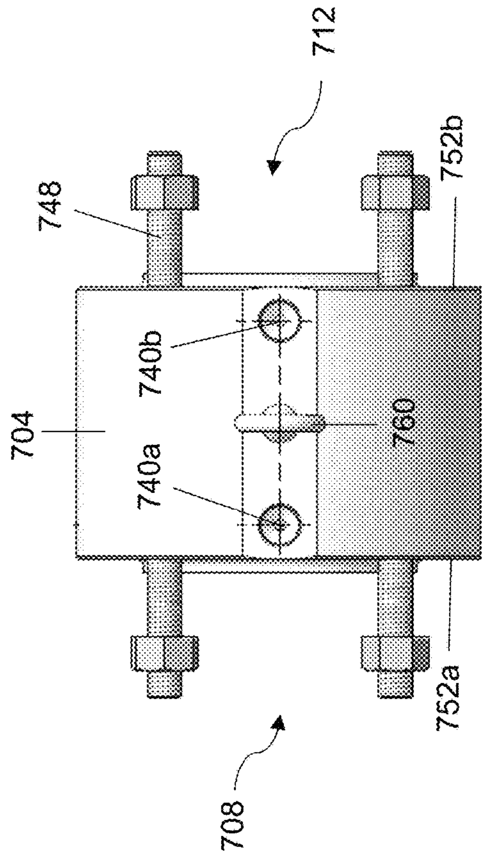
FIG. 8C shows a top view of the mixing apparatus of FIG. 8A.
Figure 8D:
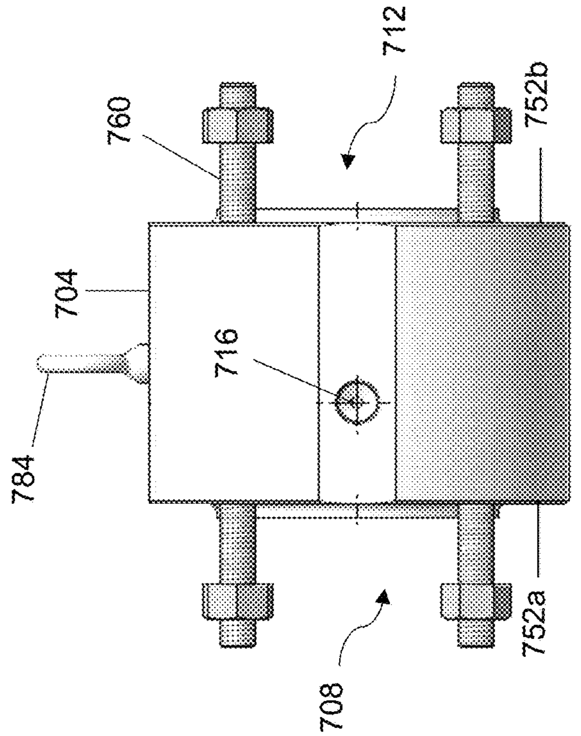
FIG. 8D shows a side view of the mixing apparatus of FIG. 8A.

Referring now to FIGS. 8A-8D, FIG. 8A shows an isometric cut-away view of an embodiment of the present mixing apparatuses with threaded studs. FIG. 8B shows an outlet end view of the mixing apparatus of FIG. 8A. FIG. 8C shows a top view of the mixing apparatus of FIG. 8A. FIG. 8D shows a side view of the mixing apparatus of FIG. 8A.

As best illustrated in FIG. 8A, in some embodiments of the present mixing apparatuses, the plurality of threaded holes 756 disposed radially around flange faces 752*a*, 752*b*, comprise a plurality of threaded studs 748 extending therefrom. In the embodiment shown, mixer body 704 is similar internally to the mixer body in FIGS. 4A and 4B. Mixer body 704 defines a plurality of support arms 732*a*, 732*b*, that are unitary (i.e., formed as a single, monolithic piece of material) with mixer body 704 and that extend radially inward from interior surface 704*b*. In some embodiments, support arms 732*a*, 732*b* may be disposed in a first portion of the passage in the mixer body, but in other embodiments, may be disposed in a second portion of the passage in the mixer body (e.g., with a central portion extending forward to support the flow member).

As shown in FIG. 8A, mixer body 704 has an exterior surface 704*a* and interior surface 704*b*, where mixer body 704 defines at least one body injection passage 720 extending from an injection inlet 716 on exterior surface 704*a* of mixer body 704, through one of the support arms (e.g., 752*a*, 752*b*). As best illustrated in FIGS. 8A, 8C, 8D, the longitudinal ends of mixer body 704 also defines flange faces 752*a*, 752*b*, comprising a plurality of threaded studs 748 extending from a plurality of threaded holes 756 disposed radially around the flange faces. In the embodiment shown, mixer body 704 also defines differential pressure ports 740*a*, 740*b*, as shown in FIGS. 8A and 8C, extending from two respective pressure outlets 744*a*, 744*b* on the exterior surface of mixer body 704. In some embodiments, mixer body 704 also defines at least one threaded loop hook 760 extending from exterior surface 704*a* of mixer body 704.

In the embodiment shown, flow member 736 defines a flow member injection passage 724 extending through at least a portion of flow member 736 to an injection outlet 728 defined at the leading end or peripheral surface of flow member 736 (e.g., at the leading end, as shown). Flow member 736 is coupled to the support arms (e.g., 752*a*, 752*b*) such that injection inlet 716 is in fluid communication with injection outlet 728 via mixer body injection passage 720 and flow member injection passage 724. For example, in the embodiment shown, flow member 736 is unitary with support arms 752*a*, 752*b*, and mixer body 704, such that mixer body injection passage 720 and flow member injection passage 724 are two portions of a common passage. In other embodiments, part or all of flow member 736 may be separately coupled to the support arms (e.g., 752*a*, 752*b*) to also bring flow member injection passage 724 into fluid communication with mixer body injection passage 720.

In the embodiment shown, mixing apparatus 700 also comprises a substantially conical flow member 736 coupled to support arms 752*a*, 752*b*. In this embodiment, flow member 736 has a leading end 736*a*, a base 736*b* opposite the leading end 736*a*, and a peripheral surface 736*c* extending between the leading end 736*a* and the base 736*b*. A flow axis extends through respective centers of leading end 736*a* and base 736*b*, and flow member 736 is coupled to support arms 752*a*, 752*b*, such that leading end 736*a* faces inlet 708 of mixer body 704, base 736*b* faces outlet 712 of mixer body 704. In other embodiments, the flow member may be substantially pyramidal.

In other embodiments, injection outlet 728 may be disposed on peripheral surface 736*c* of flow member 736. For example, the mixer body injection passage 720 may extend radially inward through support arm 732*a*, and flow member injection passage 724 may continue radially across the flow member to an injection outlet on the peripheral surface of the flow member (i.e., rather than extending longitudinally to the leading end).

In some embodiments of the present mixing apparatuses, each of the support arms has a longitudinal axis disposed at an angle 85 to 95 degrees relative to the flow axis.

In some embodiments of the present mixing apparatuses, such as the embodiment shown in FIG. 2, each of the support arms are configured such that each support arm has a corresponding injection inlet 140*a*, 140, 140*c*, in fluid communication with injection outlet 156 via mixer body injection passage 144*a*, 144*b*, 144*c*, and the flow member injection passage 148*a*, 148*b*, 148*c*.

In some embodiments of the present mixing apparatuses, one or more of the support arm injection inlets 140*a*, 140*b*, 140*c*, may be plugged from a first injection passage end (e.g., 144*a*, 144*c*, 144*e*) toward a second injection passage end (e.g., 144*b*, 144*d*, 144*f*) to prevent passage of fluid to flow member injection passage 148*a*, 148*b*, 148*c*.

In some embodiments of the present mixing apparatuses, the mixer body is coupled to a pipe fitting configured to permit injection of more than one chemical by one or more of the following: an off-center drill tap, an upstream injection quill, a bleed ring, an injection weldolet, or other entry point.

In some embodiments of the present mixing apparatuses, the mixing apparatus is connected in series, each mixing apparatus configured to receive a chemical to be mixed with an upstream mixture of chemicals.

In some embodiments of the present mixing apparatuses, the mixer body defines an elongated, narrow pipe with an inner diameter less than the pipe inner diameter of the upstream and downstream longitudinal ends, where increased velocity and turbulence is provided by larger mass transfer contact prior to allowing the downstream cone opening to occur at an 8 degree angle.

In some embodiments of the present mixing apparatuses, the injection inlet is omitted from the exterior surface of the mixer body.

In some embodiments of the present mixing apparatuses, the flow member is configured as an interchangeable component within a flange connection.

In some embodiments of the present mixing apparatuses, the mixer body is machined as a full pipe outer diameter from a single piece of metal and coupled between two flanges.

In some embodiments of the present mixing apparatuses, the mixer body is configured to be interchangeable based on process flow conditions.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A mixing apparatus comprising:

a mixer body having an exterior surface and an interior surface, the mixer body defining an inlet and an outlet, the interior surface defining a passage extending between the inlet and the outlet to permit a first fluid to flow sequentially through the inlet, the passage, and the outlet, where:
- a first portion of the passage narrows in a direction of flow from the inlet to a point of constriction;
- a second portion of the passage expands in the direction of flow from the point of constriction to the outlet;
- a channel axis extends longitudinally through a center of the first and second portions of the passage;
- the mixer body defines a plurality of support arms that are unitary with the mixer body and that extend radially inward from the interior surface in the first portion of the passage; and a substantially conical flow member having a leading end, a base opposite the leading end, a peripheral surface extending between the leading end and the base, and a flow axis extending through respective centers of the leading end and the base, where a trailing end surface of the base is flat and positioned substantially perpendicular to the flow axis, and where the peripheral surface is solid and an entirety of the base is flat; and where the substantially conical flow member is coupled to the support arms such that the leading end faces the inlet of the mixer body, the base faces the outlet of the mixer body, and the flow axis is substantially parallel to the channel axis, where the substantially conical flow member defines a flow member injection passage extending through at least a portion of the substantially conical flow member to an injection outlet defined at the leading end of the substantially conical flow member, the mixer body defines at least one body injection passage extending from an injection inlet on the exterior surface of the mixer body through one of the support arms, and where the substantially conical flow member is positioned in the center of the passage and sized to enable fluid to flow around an outside of the substantially conical flow member in the passage.

2. The mixing apparatus of claim 1, where:

the substantially conical flow member is coupled to the support arms such that the injection inlet is in fluid communication with the injection outlet via the at least one body injection passage of the mixer body and the flow member injection passage of the substantially conical flow member.

3. The mixing apparatus of claim 2, where:

the substantially conical flow member defines a plurality of flow member injection passages, including the flow member injection passage, each flow member injection passage extending through at least a portion of the substantially conical flow member to a corresponding injection outlet defined at the peripheral surface of the substantially conical flow member; and the substantially conical flow member is coupled to the support arms such that the injection inlet is in fluid communication with all of the injection outlets of the plurality of flow member injection passages via the at least one body injection passage and the plurality of flow member injection passages.

4. The mixing apparatus of claim 1, where the substantially conical flow member is unitary with the support arms, the mixer body does not include pipe flanges, and where longitudinal ends of the mixer body are not threaded.

5. The mixing apparatus of claim 1, where two or more flanges extend radially outward from the exterior surface of the mixer body, the two or more flanges are longitudinally spaced along the exterior surface of the mixer body, the two or more flanges defining a plurality of pairs of guide openings, each pair of guide openings being aligned along a respective guide axis that is parallel to the channel axis.

6. The mixing apparatus of claim 1, where the mixer body defines two differential pressure ports extending from the exterior surface of the mixer body into the passage, a first one of the differential pressure port extends to the first portion of the passage, and a second one of the differential pressure ports extends into the second portion of the passage.

7. The mixing apparatus of claim 1, where longitudinal ends of the mixer body define male threads or female threads configured to receive a pipe fitting and hammer union washer or a flange fitting.

8. The mixing apparatus of claim 7, further comprising flange fittings, each flange comprising a pressure port.

9. The mixing apparatus of claim 8, where the flange faces define a plurality of threaded holes disposed radially around the flange faces.

10. The mixing apparatus of claim 1, where longitudinal ends of the mixer body define hammer union joints.

11. The mixing apparatus of claim 1, where each of the support arms has a longitudinal axis disposed at an angle 85 to 95 degrees relative to the flow axis.

12. The mixing apparatus of claim 1, where each of the support arms are configured such that each support arm has a corresponding injection inlet in fluid communication with the injection outlet via the at least one body injection passage of the mixer body and the flow member injection passage of the substantially conical flow member.

13. The mixing apparatus of claim 1, where the mixer body is coupled to a pipe fitting configured to permit injection of more than one chemical by one or more of the following: an off-center drill tap, an upstream injection quill, a bleed ring, an injection weldolet, or other entry point.

14. The mixing apparatus of claim 1, where the mixing apparatus is connected in series, each mixing apparatus configured to receive a chemical to be mixed with an upstream mixture of chemicals.

15. The mixing apparatus of claim 1, where the mixer body defines an elongated, narrow pipe with an inner diameter less than a pipe inner diameter of upstream and downstream longitudinal ends, where the outlet of the mixer body comprises a downstream cone opening, and where increased velocity and turbulence is provided by larger mass transfer contact prior to allowing the downstream cone opening to occur at an 8 degree angle.

16. The mixing apparatus of claim 1, where the substantially conical flow member is configured as an interchangeable component within a flange connection.

17. The mixing apparatus of claim 1, where the mixer body is machined as a full pipe outer diameter from a single piece of metal and coupled between two flanges.

18. The mixing apparatus of claim 1, where the mixer body is configured to be interchangeable based on process flow conditions.

* * * * *